US00RE38494E

(19) United States
(12) Reissued Patent
Kirker et al.

(10) Patent Number: US RE38,494 E
(45) Date of Reissued Patent: Apr. 13, 2004

(54) METHOD OF CONSTRUCTION FOR DENSITY SCREENING OUTER TRANSPORT WALLS

(75) Inventors: Curtis Kirker, Kamuela, HI (US); Berkeley F. Fuller, Kamuela, HI (US)

(73) Assignee: Phase Inc., Kamuela, HI (US)

(21) Appl. No.: 10/087,804

(22) Filed: Mar. 4, 2002

Related U.S. Patent Documents

Reissue of:
(64) Patent No.: 6,033,564
Issued: Mar. 7, 2000
Appl. No.: 09/156,171
Filed: Sep. 17, 1998

U.S. Applications:

(63) Continuation-in-part of application No. 09/115,527, filed on Jul. 13, 1998, now Pat. No. 6,312,610.

(51) Int. Cl.[7] ..... B04B 5/00; B04B 7/12; B65H 81/00

(52) U.S. Cl. ..... 210/232; 210/360.1; 210/380.1; 29/527.1; 29/527.2; 29/527.3; 156/172; 156/430; 264/603; 494/43; 494/81

(58) Field of Search ..... 210/232, 360.1, 210/369, 372, 373, 374, 375, 376, 377, 380.1; 29/527.1, 527.2, 527.3, 527.5, 530, 889; 156/172, 430; 264/603; 494/43, 53, 68, 74, 81

(56) References Cited

U.S. PATENT DOCUMENTS

| | | | | |
|---|---|---|---|---|
| 2,028,168 A | * | 1/1936 | Roberts | 210/380.1 |
| 2,538,529 A | | 1/1951 | Komline | 233/20 |
| 2,688,437 A | | 9/1954 | Monnet | |
| 3,327,401 A | | 6/1967 | Stamos et al. | |

(List continued on next page.)

FOREIGN PATENT DOCUMENTS

| | | | |
|---|---|---|---|
| DE | 1 632 324 | 10/1970 | B04B/3/20 |
| EP | 0346056 | 12/1989 | B04B/1/08 |

(List continued on next page.)

OTHER PUBLICATIONS

International Search Report PCT/US 99/15891, 6 pages, Oct. 14, 1999.

(List continued on next page.)

*Primary Examiner*—David A. Reifsnyder
(74) *Attorney, Agent, or Firm*—Baker Botts L.L.P.

(57) ABSTRACT

A method for combining three different means of constructing the concentric layers of the outer collecting wall for industrial size centrifuges, whereby treating the inward-facing elements of easily cast or stamped materials using processes such as Physical Vapor Deposition, Chemical Vapor Deposition or metal plating, transforms them into an innermost member with superior hardness and durability, and whereby said wear surface member or deposited layer is physically supported by a middle composition layer made up of one or more investment castings designed to optimally transfer centrifugally-induced compression loads from the innermost wear surface toward the outer surface of the composite wall, such castings being of ceramic, metals or other materials, and whereby the outer surface of said composite wall is comprised of a filament-wound hoop strength reinforcement layer, using aramid, graphic, carbon or such fibers mixed and embedded in resin, such that all highly desirable characteristics for a centrifuge outer, heavies-collecting wall are provided, including interior hardness and wear abrasion, incompressibility and intrinsic dynamic balance, and substantially higher hoop or bursting strength, than can be attained through any metal-crafted centrifuge outer wall, and, model for model, for substantially lower design and fabrication costs.

26 Claims, 27 Drawing Sheets

U.S. PATENT DOCUMENTS

| | | | | | |
|---|---|---|---|---|---|
| 3,937,317 | A | * | 2/1976 | Fleury, Jr. | |
| 3,960,318 | A | | 6/1976 | Dahlberg | |
| 3,967,778 | A | | 7/1976 | Hunwick | |
| 3,977,515 | A | * | 8/1976 | Lewoczko | |
| 4,005,817 | A | | 2/1977 | Charlton et al. | |
| 4,015,773 | A | | 4/1977 | Thylefors | |
| 4,067,494 | A | | 1/1978 | Willus et al. | |
| 4,070,290 | A | | 1/1978 | Crosby | 210/91 |
| 4,103,822 | A | | 8/1978 | Stroucken | |
| 4,251,023 | A | | 2/1981 | Hohne et al. | |
| 4,298,162 | A | | 11/1981 | Hohne | |
| 4,311,270 | A | | 1/1982 | Hovstadius | |
| 4,331,270 | A | | 5/1982 | Humlong | |
| 4,343,431 | A | | 8/1982 | Wehling | |
| 4,375,870 | A | | 3/1983 | Bodelson | 494/40 |
| 4,379,976 | A | | 4/1983 | Pitchford et al. | 310/83 |
| 4,381,849 | A | | 5/1983 | Conant | 494/43 |
| 4,430,221 | A | | 2/1984 | Spiewok | 210/380.1 |
| 4,504,262 | A | | 3/1985 | Forsberg | 494/53 |
| 4,505,697 | A | | 3/1985 | Lee et al. | 494/35 |
| 4,519,496 | A | * | 5/1985 | Ludvigsen | |
| 4,569,761 | A | * | 2/1986 | Spiewok et al. | 210/380.1 |
| 4,581,896 | A | | 4/1986 | Andresen et al. | 60/489 |
| 4,629,564 | A | | 12/1986 | Pinato | 210/512.3 |
| 4,643,709 | A | | 2/1987 | Lee et al. | 494/37 |
| 4,698,053 | A | | 10/1987 | Stroucken | 494/70 |
| 4,701,158 | A | | 10/1987 | Inge et al. | 494/74 |
| 4,710,159 | A | | 12/1987 | Gullers | 494/27 |
| 4,721,505 | A | | 1/1988 | Inge et al. | 494/74 |
| 4,729,759 | A | | 3/1988 | Krook et al. | 494/4 |
| 4,813,923 | A | | 3/1989 | Johansson | 494/48 |
| 4,820,256 | A | | 4/1989 | Nordstrom | 494/3 |
| 4,840,612 | A | | 6/1989 | Pallmar | 494/2 |
| 4,861,329 | A | | 8/1989 | Borgstrom et al. | 494/73 |
| 4,978,331 | A | | 12/1990 | Luchetta et al. | 494/37 |
| 5,045,049 | A | | 9/1991 | Lantz | 494/70 |
| 5,052,996 | A | | 10/1991 | Lantz | 494/68 |
| 5,197,939 | A | | 3/1993 | Cederkvist et al. | 494/53 |
| 5,202,024 | A | | 4/1993 | Andersson et al. | 210/360.1 |
| 5,244,584 | A | * | 9/1993 | Schlieperskoetter | 210/787 |
| 5,362,292 | A | | 11/1994 | Borgstrom et al. | 494/74 |
| 5,374,234 | A | | 12/1994 | Madsen | 494/43 |
| 5,380,434 | A | * | 1/1995 | Paschedag | 210/360.2 |
| 5,397,471 | A | | 3/1995 | Rodebush | 210/360.1 |
| 5,429,581 | A | * | 7/1995 | Michaud | |
| 5,601,522 | A | * | 2/1997 | Piramoon | 156/172 |
| 5,759,744 | A | | 6/1998 | Brueck et al. | 430/312 |
| 6,149,572 | A | | 11/2000 | Knelson | |
| 6,322,698 | B1 | | 11/2001 | Rios et al. | 210/321.75 |

FOREIGN PATENT DOCUMENTS

| | | | |
|---|---|---|---|
| FR | 870540 | 3/1942 | 14/6 |
| FR | 1 038 726 | 10/1953 | 5/5 |
| JP | 11330379 | 10/1999 | |
| WO | WO 00/02663 | 1/2000 | B04B/1/00 |
| WO | 02/42004 A1 | 5/2002 | B04B/15/06 |

OTHER PUBLICATIONS

International Search Report PCT/US 02/36830, 8 pages, Mar. 12, 2003.

Search Report from PCT US 02/13186, Mailed Sep. 10, 2002.

* cited by examiner

Manufacturing Processes

– PRIOR ART –

*Taxonomy of Manufacturing Processes: Manufacturing Processes*

Mass-Reducing

*Taxonomy of Manufacturing Processes: Mass-Reducing*

Figure 1.4 (page 8). Diagrammatic representation of an M.S.E. 8x10 ml angle head rotor. At 30,000 rev/min, theg-values are as follows: R-min 37,000g, R-av 60,000 g, and R-max, 80,000 g.

| | LOAD COMPRESSION-TRANSFER CASTING TYPE | | |
|---|---|---|---|
| | Monolithic | Horizontal | Vertical |
| **Vane Slots** (For Solid Core with Anti-vorticity Vanes) | (a) Figs. 7,9,12 | (c) Figs. 10,11,12 | (e) Figs. 14,16,18 |
| **No Vane Slots** (For Core types without radiating Vanes) | (b) Figs. 8 & 13 | (d) Fig. 13 | (f) Figs. 15,17,19 |

COMBINATION / ASSEMBLY EXAMPLES

| Monolithic Casting, Disk Stack type Core | Stacked Horizontal Castings, Solid Type Core with Vanes to create Vertical Sector Fluid Work Areas | Combined Vertical Castings, Disk Stack type Core |
|---|---|---|
| (x) Figure 24 | (y) Figure 25 | (z) Figure 26 |

FIG. 7

Windable Filaments of Kevlar, Carbon Epoxy and Blends

– PRIOR ART –

METHOD OF CONSTRUCTION FOR DENSITY SCREENING OUTER TRANSPORT WALLS

Matter enclosed in heavy brackets [ ] appears in the original patent but forms no part of this reissue specification; matter printed in italics indicates the additions made by reissue.

[This application is A Continuation-in-Part of U.S. patent application Ser. No. 09/115,527, filed Jul. 13, 1998 still pending.]

*BACKGROUND—CROSS REFERENCES TO INVENTORS' ADDITIONAL PATENTS*

*This application is a reissue patent application of U.S. patent application Ser. No. 09/156,171 filed Sep. 17, 1998, now U.S. Pat. No. 6,033,564; which is a continuation-in-part application of U.S. patent application Ser. No. 09/115, 527 filed Jul. 13, 1998, now U.S. Pat. No. 6,312,610.*

BACKGROUND—FIELD OF INVENTION

The pertinent field of the invention is the "imperforate bowl," related to prior art under "fluid separation," especially "Disk Centrifuges," "Nozzle Centrifuges," and "Split Bowl Centrifuges"

BACKGROUND—DESCRIPTION OF PRIOR ART

Within the scope of this application, prior art is taken to mean conventional methods of construction for the outer walls of centrifuges. One such method for such design, fabrication and assembly predominates for all major types or classes of imperforate bowl centrifugal devices, including notably: (1) those used to separate small volumes of materials, such as Test Tube, Tubal, Preparatory and Zonal Centrifuges; and (2) those used to process industrial volumes of materials, including Decanting Centrifuges, and Disc Centrifuges. Disk type imperforate bowl devices further break down into Manual Discharge, Intermittent Discharge (Split Bowl and Valve Nozzle), and Continuous Discharge (Open Nozzle) models.

To put the conventional methods of centrifuge outer wall construction into perspective, this application refers to one particular reference work regarding methods of manufacture, which is: Fundamental Principles of Manufacturing Processes, by Robert H. Todd, Dell K. Allen and Leo Alting, Industrial Process, Inc., New York, N.Y., 1994.

For nearly 100 years, the one highly predominant method of centrifuge fabrication for all three types of imperforate bowl devices has been their fabrication in steel, stainless steel, and various other steel alloys. Such metal construction requires fabrication methods including "shaping" via "mass-reducing", primarily through "mechanical reducing," techniques such as turning, carving, lathing, milling and drilling. (See FIGS. 3 and 4, which are reproductions of page 8 and 9 of the referenced work).

This often-cited reference work places each means of construction, as of 1994, into a hierarchical taxonomy of manufacturing methods. In its introduction to this taxonomy, the authors state:

> The Manufacturing Processes Taxonomy, based on the process classification method initially developed at Brigham Young University and later adapted by members of the Manufacturing Consortium, provides a precise roadmap of some 300 processes used for modifying geometry or properties of engineering materials. It has been said that students can learn twice as much in half the time when the material to be studied has been classified and the critical attributes have been clearly identified. In this text we attempt to do both. Processes used for modifying workpiece geometry [italics from the authors] are called "shaping processes." Processes used for modifying properties [italics from the authors] are called "nonshaping" processes. (Page 6).

Thus, the objective of this book is to assist industrial designers by informing them of all possible construction avenues, and of the tradeoffs inherent in each type of material and method of construction, so as to pro-actively achieve maximum appropriateness and cost-effectiveness in their finished goods. Or, as stated in Chapter 1.

> In manufacturing, the actual materials and equipment used are costly, but these costs are substantially determined by those responsible for product design before manufacturing even begins. By virtue of decisions made early in the production process, designers determine up to 70 percent of manufacturing costs." (Page 1).

Not surprisingly, many long-established industrial goods still being produced today were originally designed using the material choices and manufacturing methods developed during the industrial revolution. This is true in general of products fashioned in metal, and specifically of imperforate bowl centrifuge.

Because of the century-long tradition of building centrifuges in metal, one can accurately describe the metal manufacturing techniques used by imperforate bowl device builders as the "tried and true" fabricating methods for this industry.

As interesting "tried and true" phenomenon occurs in manufacturing. If, at any given point in time, you only have certain ways to build something, then the things you can build in those ways are what get built. Then, because of the things you have gotten used to building, you cease looking for different ways to build, because you already have a successful product, done "the way you already do it." This phenomenon goes to the heart of the patent issue of non-obviousness. If the many advantages of other-than-metal construction were obvious to experts in the field of imperforate bowl centrifuges, such constructions would be patented, commercially available, and, in view of their claimed cost and performance superiority, even prevalent in the field. By contrast, what we see instead in the field of the industrial-volume imperforate bowl is steel and alloy centrifuges.

The inventors do not claim that conventional centrifuge construction via conventional metal-crafting has no place in many traditional products. But it is clear that a wealth of superior new material and fabrication methods for the highly stressed outer walls of centrifuges has become available, particularly since the 1970's, and that this wealth to date has been all but ignored by centrifuge makers, particularly by manufacturers building industrial-volume devices. Such manufacturers are busy building existing steel and alloy walled devices, "the way they are used to building them." They do not appear to be exploring radical new hybrid or composite construction methods for their imperforate bowl products.

These realizations led to a key design decision on the part of the inventors of the Density Screening outer wall transport system pending U.S. patent application Ser. No. 09/115, 527. This decision was to explore the possible benefits to be obtained from a complete rethinking of the materials and methods of construction for the outer, collecting walls of centrifuges, from the point of view of works such as Fundamental Principles of Manufacturing Processes.

This decision posed the initial manufacturing philosophy question: "If you were inventing centrifuge afresh, today, and you had the entire breadth of old and new manufacturing processes at your disposal, what materials and what manufacturing methods would you select?" Again, this is not a question the traditional device builders appear to have asked. When the benefits of such a rethinking become apparent, it is clear that the traditional metal fabrication mindset of centrifuge builders has prevented them from seeing the obvious: that selected new materials offer extraordinary new benefits and advantages, including both greatly increased strength and far lower cost.

As research and design work continued, several related secondary questions emerged. These were: (1) Is it possible to conceptually filet a centrifuge outer wall into different layers, and then define the unique physical functions and properties ideal to achieve in early layer? (2) Would it then be desirable and practical to employ radically different materials and manufacturing methods for each such individual filet or layer of a centrifuge outer wall, so that each such member provided the ideal mix of physical characteristics and cost performance for that layer? And, (3) Might it then also occur that all of said ideally fabricated individual layers, when combined together, yield an overall design strategy far superior, both in physical characteristics and cost performance, to traditional design and construction methods, for centrifuge outer collecting walls?

The rich, multiple answers to the first question led the inventors to discard conventional manufacturing wisdom and techniques for the product in question. The answer to the secondary questions also turned out to be resounding "yes's," which answers then led to the hybrid fusion of variably-fabricated outer wall elements, each constructed using a different technology, which is the method of construction claimed in this application. This design fusion also characterizes and made possible the Density Screening outer transport wall geometry method claimed pending U.S. patent application Ser. No. 09/115,527.

In a nutshell, the inventors first realized that, if all required physical and structural requirements for centrifuge outer walls could be achieved by building centrifuges of a combination of (1) castings made of relatively inexpensive aluminum or ceramic, (2) chemically hardened wear surfaces, (3) plastics and (4) high-tensile strength reinforcing fibers, the resulting devices should be far less expensive than traditional art built of high-strength steels or alloys.

As the hybrid or sandwich construction method developed, the inventors further realized that these methods enable the design and construction of centrifuge outer wall geometries that are either not possible, or prohibitively expensive to do in conventional metal. The first utility patent filed covered these new, material-facilitated geometries, while this application claims the composite means of construction which makes those geometric possible.

Review of Three Classes of Centrifuge, All Constructed In Cast and Carved Metals Tubal centrifuges are usually small-scale, laboratory devices constructed of a cylindrical metal outer wall enclosing the fluid work area, which in turn surrounds a conventionally constructed metal solid core. Some tubal centrifuges add vertical metal vanes, radiating from the solid core to the interior of the outer wall cutting through the fluid work area to vertical fluid separation zones; such centrifuges are thus called zonal centrifuges.

Decanting centrifuges are high volume workhorses for applications such as wastewater treatment and oil platform fluid recycling. These are long and narrow devices, in either vertical or horizontal configuration, and are also built of metals using traditional casting, milling and carving methods. The transport solution in Decanting Centrifuges is a tight-fitting helical screw fitted against the inside of the outer wall, which scrapes out heavy materials being thrown and held against that outer wall by centrifugal force. Among the numerous examples of decanting centrifuge prior art, including decades of improvement patents for various forms of multi-speed transmissions, wear-surface improvements and the like, are: U.S. Pat. Nos. 3,937,317, 3,960,318, 3,967,778, 3,977,515, 4,070,290, 4,251,023, 4,298,162, 4,379,976, 4,381,849, 4,504,262, 4,519,496,4,581,896, 4,978,331, 5,197,939, 5,374,234, 5,380,434, 5,397,471 and 5,429,581. The foregoing is a representative, but by no means exhaustive, list of such prior work.

Disk Centrifuges. This third class of centrifuges approaches high volume in continuous operation in a more design-elegant way, through the use of the pure geometry in the form of the heavy material receiving shapes in the device's outer walls. These devices, all within the family of Disk Centrifuges are variously called Continuous Discharge Nozzle, Nozzle-Valve, and Split Cone centrifuges, depending on the details of their heavy particle collection and ejection approaches. From within the large field of prior art for these centrifugal devices, notable are patents U.S. Pat. Nos. 4,005,817, 4,015,773, 4,067,494, 4,103,822, 4,311,270, 4,343,431, 4,375,870, 4,505,697, 4,629,564, 4,743,709, 4,698,053, 4,701,158, 4,710,159, 4,721,505, 4,719,759, 4,759,744, 4,813,923, 4,820,256, 4,840,612, 4,861,329, 5,045,049, 5,052,996, 5,202,024, and 5,362,292. Again, the preceding list is not intended to be exhaustive, but rather illustrative of the disk centrifuge approach and some of the many attempts by numerous inventors and manufacturers to improve it over the years. All the Disk type centrifuges also employ conventionally cast, carved, polished and turned meal outer walls, which walls are generally fashioned as a pair of upper and lower bell-shaped shells which flare out at their beltline connecting point.

Two Primary Centrifuge Outer Wall Material Considerations (1) Abrasion-Resistance (Hardness)

The two primary qualities addressed in conventional, metal-constructed centrifuge outer walls are wear-resistance, and bursting or hoop strength. To put these two qualities in proper perspective, it is helpful to first review the operating environment and physical requirements for centrifuge outer walls.

First, regarding wear surfaces, centrifuge interiors in general and particularly the interior surface of the outer wall of a centrifuge, are an extremely punishing and hostile environment for any chosen construction materials. The outer wall of any centrifuge is constantly bombarded by abrasive, heavy materials, made many times heavier and more abrasive than they would be at rest by the action of centrifugal force. The effect is similar to that of continuous heavy sandblasting. Thus the first criterion for outer walls in centrifuges is that they be made as abrasion resistant and hard as possible.

Various steel alloys, and sometimes titanium, used in tubal, decanting and disk centrifuges, supply sufficient hardness to permit the ongoing sale and use of large numbers of practical, commercial machines. However, newer technologies exist which would permit the construction of interior wall surfaces having many times the hardness or abrasion-resistance of the hardest metals.

(2) Burst or Hoop Strength

Bursting or hoop strength is, as the name implies, the ability of a vessel to maintain its structural integrity despite internal pressures or centrifugal forces acting upon that vessel.

The outermost diametric zones of centrifuges receive the highest gravitational forces within any given device. (The further out from the axis of rotation you are, the higher are the centrifugal forces.) This phenomenon is a function of the basic physics of centrifugal force; one of many sources which document this fact is the Laboratory Monograph, "Ultra-Centrifugation," by J. S. McCall and B. J. Potter, as illustrated in FIG. 5 (text annotation in FIG. 5 is a direct quote of the illustration legend in this reference work).

Thus, centrifuge outer walls fabricated of conventionally fabricated steels, titaniums and various metal alloys not only must have sufficient bursting or hoop strength to hold together as their own weight is increased many hundreds or thousands of times by centrifugal force, but also must exhibit strength beyond this, to contain the heavy materials being thrown against them from the centrifuge core. These materials also weigh hundreds or thousands of times their at-rest weight.

The outer wall of centrifuges must therefore resist and contain cumulatively the amplified weight of the wall itself plus the thrown weight of the heaviest materials being processed. As is the case with hardness and abrasion-resistance, all three types of commercial centrifuges have successfully employed metal materials and fabrication technologies in support of outer walls of sufficient strength to work within existing device paradigms. Review of both prior art patents and available product literature for all types of centrifuges reflects the decades of engineering experience in the form of a mature traditional wisdom regarding the maximum diameters for metal centrifuges. These diameters are a function of the maximum rotational speed to be employed in a given unit.

To reiterate, the broader the diameter of a centrifuge, the more gravitational or bursting force is placed on those components of that centrifuge which are furthest out from the axis of spin, which components are always the outer wall. The diameter limits of metal centrifuge bursting strength, regardless of how the material is fabricated and finished, appears to be in the area of 36 to 48 inches for relatively low-gravity devices (producing up to 2,500 to 3,000 gravities), down to much smaller devices, such as five to 10" in diameter, for devices operating in the ultracentrifuge range (tens of thousands of gravities or higher).

To put this yet another way, a centrifuge outer wall of a given outer diameter ("x" inches) operating at its maximum burst strength RPM's will likely experience structural failure if that centrifuge's rotational speed is further increased. And, conversely, a given centrifuge operating at its maximum outer wall burst strength at a fixed RPM will also likely fail at that RPM if its design diameter is further increased.

The well-documented strength ceilings for steel, titanium and alloy metal used in centrifuge outer walls, and the well-known ratios of rotational speed/centrifugal force times diameter which are governed by those limitations, have created widely accepted limitations for the use of centrifuges. On one hand, it is clearly possible with existing materials and (metal) fabrication methods to build devices which process very small quantities of fluid (pints or quarts) at comparatively high gravities (in small diameter devices such as tubal or zonal centrifuges). And, on the other hand, it is also possible build devices, such as industrial disk or decanter centrifuges, which process much larger quantities of fluid (hundreds of gallons), but only at much, much lower gravities.

What appears not to be possible using the decades-old metal based methods of construction and assumptions inherent to all conventional centrifuges is the processing of comparatively large volumes of fluid at centrifugal forces well above approximately 2,500 to 3,000 gravities. This cannot presently be done because metals cannot provide sufficient hoop or bursting strength to contain the heavier, high volumes, in large diameters, at higher gravities.

Societal Ramifications of the Limitations of Prior Art Outer Wall Fabrication Methods Many of today's most pressing environmental problems present very high processing volumes combined with extremely fine, light (and often very dangerous, i.e., cryptosporidium cysts in water supply) particles requiring separation. This is exactly the combination which conventional, metal-fabricated centrifuges cannot economically supply, namely, high-volume processing at high enough centrifugal forces (estimated at 8,000 gravities) to remove "particles" down to the one-half micron range. The current (summer 1998) shutdown of the municipal water system in Sydney, Australia, due to the takeover of that supply by mutated, chlorine-resistant, very small bacteria is but the latest example of such growing environmental problems.

The one exception to the blanket statement that industrial-volume centrifuges cannot remove ultra-small particles is the expensive, mechanically elaborate disk centrifuge, which uses the amplifying effect of stacked disks to produce fine particle separation using lower centrifugal forces, in the realm of 2,500 to 3,000 gravities, some models of which can remove particles in the sub-micron range. However the very high initial cost of and extensive ongoing maintenance required by each of these centrifuges has so far inhibited their use in large arrays of many of such devices, as would be required, for example, to continuously treat all the drinking water for a large metropolitan area.

In the absence of affordable, large-volume, very high speed, ultra-small particle removing centrifuge, chemical additives plus filtration has become the hybrid treatment of choice for large-volume water supply treatment, even though the problems of membrane clogging, filter cleaning, replacement cost and the landfill storage of used filters keep chemistry plus filtration from appearing to be the ideal or elegant long-term solution for water treatment. In addition, more and more long-term health disadvantages of the use of chemicals in water, both individually and from the side-effects of their combinations, are coming to light. These widespread and intractable disadvantages further underscore the desirability of cost, strength, volume and operating breakthroughs in centrifuge design generally, as dictated by centrifuge outer wall design specifically.

To summarize, laboratory tubal centrifuges can gravitationally separate out the kinds of ultra-small, ultra-light particles which plague the nation's water supply, but only in test-quantity sizes. Those disk centrifuges which use stacked disk cores to amplify gravitational separation can separate quite small particles from fluids, in industrial size quantities, due to that amplification technique allowing the use of rotational forces below 3,000 gravities; however, such extremely complex, and maintenance-intensive devices cost many hundreds of thousands of dollars each. Again, they have not been adopted for large scale fluid separation such as water treatment, most likely because they are not cost-effective for such mass use. Finally, commercial decanting centrifuges' upper centrifugal limits in the 2,500 gravity range, lacking the amplifier effect of stacked disks, cannot remove particles below approximately 3 to 5 microns. And, large volume Decanters are also extremely expensive, approaching one million dollars apiece.

All of the foregoing is to illustrate that the outer wall material chosen for traditional centrifuges has had an enormous impact on these devices' limitations of use. The inventors of the Density Screening outer wall transport method not only rejected the traditional wisdom of metal outer wall construction, but in so doing, have also rejected the traditionally accepted end-application and cost limitations placed on various types of available centrifugal devices.

Objects and Advantages

When the inventors committed their researches to the re-thinking of the basic material, or materials, used to fabricate centrifuge outer walls, they also became freed up to consider using multiple materials, in a hybrid sandwich, with each layer of material being chosen to do a specific indicated job in the strongest, least expensive way possible.

The researchers chose to emulate or model the sequential trajectory of heavy particles being thrown from the core of a rotating centrifuge, out to and as it developed, through the outer wall of a centrifuge. This intellectual process of following a hypothetical thrown particle, along its journey from the inside of the outer wall to the outside, and assessing the materiel requirements of an ideal centrifuge outer wall at each point of this trajectory, led to the following sequential or layered analysis of the ideal characteristics for each point or layer of this journey.

Water Surface Technology

The primary, explicit job of a centrifuge is to throw heavies outward, thus sorting them away from the lighter fluid flow of the device's center core. The ejecting heavies, the densest and often most abrasive materials in a given fluid flow, thus constantly bombard the innermost or facing surface of the outer wall of a centrifuge. The inventors' review of old and new manufacturing materials and of their related fabricated processes, as available in the late 1990's, led through the manufacturing taxonomy to "non-shaping", and then to "surface finishing" and then to "surface-coating" (see FIG. 3, a reproduction of page 8, Dodd, Allen & Alting, op.cit.).

In-depth review of many different types of "high-tech" surface coatings revealed how, among many late $20^{th}$ century hardening methods, the outer surface of an inexpensive and thin, cast or stamped aluminum part can be transformed, through processes such as "Physical Vapor Deposition" (PVD), into ultra-hard sapphire, or by "Chemical Vapor Deposition" (CVD) into other extremely hard surfaces. These are but two of several surface coating technologies which can turn a very inexpensive piece of metal or ceramic into a part having many times the abrasion resistance and life expectancy of any comparable metal.

Once the inventors elected to slice the outer centrifuge wall into multiple, thin hybrid sections, the use of technologies such as PVD or CVD for the innermost wear surface, becomes both practical and inexpensive. See FIGS. 1 and 2, Parts 2, for illustration of two iterations of such an innermost wear-surface slice, tile or integral deposited surface, as shown in these illustrations of a single outer wall void segment of a Density Screening outer wall sandwich.

Compression Load Transfer and Support for the Wear Surfaces

Once the strategy of using an inexpensive, thin and hardness-treated wear surface layer was understood, it quickly became clear that the next outermost layer of the evolving centrifuge wall would have to satisfy two physical requirements. First, the thin wear layer would need incompressible physical support by means of the layer immediately outside or behind it. This is the case because the wear layer is not only being bombarded with many extremely heavy, abrasive individual particles being thrown from the centrifuge, but also because it is being subjected to immense, deforming, centrifugal force. This gravitational force being applied to the thin wear surface layer thus dictates the need for a backing layer behind the wear surface, to absorb and transfer the compression load of centrifugal stress.

The second requirement for the middle layer is one of dynamic balance. As stated previously in this application, centrifuges spinning at high speed have extremely low tolerance for weight or density imbalances across the axis of spin. This is the reason that steel and other metal centrifuges are laboriously lathed, turned and otherwise brought into dynamic balance after casting. In the newly developed method of construction for the Density Screening outer transport wall, the second or compression-load transfer layer needs to be designed and manufactured in such a way as to achieve dynamic balance. If such balance can be attained without expensive post-casting machine finishing, so much the better.

Fortunately the age-old manufacturing method of casting, as extensively revised during the late $20^{th}$ century, has evolved into a technology known as "investment casting." This method can mass-produce parts made of aluminum, ceramic and many other materials, notable for both the intricacy of finish it can produce with little or no post-machining, and also for its ability to produce extremely uniform weight and density characteristics in mass-produced parts.

The uniform size and density intrinsic to such parts lends itself exceptionally well to their use as the middle, compression-load-transferring layer of a centrifuge outer wall. This middle layer also comprises the greatest percentage of the mass of the hybrid outer wall assembly. If the casting or castings which comprise this layer are dynamically weight-balanced via precision casting, the cost of producing a balanced assembly is far less than the extensive finishing and balancing methods required for metal centrifuges.

In addition, for some applications, such middle-layer members can be made of extremely incompressible but comparatively lightweight materials such as cast ceramic. If this, the compression-load transfer, layer, of a given Density Screening outer transport wall is exceptionally light, or low in mass, then the total energy required to spin the entire centrifuge is reduced. See FIGS. 1 and 2, Parts 4, for a single outer wall void segment illustration of the compression-load, wear-surface backing layer, in the Density Screening outer wall sandwich.

The Key to Centrifuge Limitation: Bursting Strength

Before describing the outermost layer of the Density Screening outer transport wall, it will be helpful to review the final, most needed material characteristic for centrifuge outer walls. Until now, the limitations of metal-fabricated wall strength available in commercial centrifuges has drawn a line in the sand regarding how large they can be, and how fast they can spin.

As stated previously, metal casting and carving fabrication techniques, as applied to centrifuge design and construction, represent a thoroughly mature technology. Their size and speed limitations as applied to centrifuges are well known. And, as stated above, until now their limitations have governed centrifuge development.

In those parts of such devices having high-strength requirements, such as all parts to be high-speed rotated out away from the axis of spin where centrifugal force is the highest, metal parts is the final assembly of conventional centrifuge walls are often laboriously x-rayed to uncover metal crystal and/or welding flaws which would compromise bursting strength and lead to catastrophic failure at speed.

The extremely high cost of steel and alloyed raw materials certified to have predictable, uniform crystal structure, strength and other qualities, and the equally high cost of casting, turning, finishing, testing and documenting such parts, is well known in the metal trades. In large part because of the costs of raw materials and fabricating, a single large decanting centrifuge can cost a million dollars or more. A single conventional disk centrifuge, also metal fabricated, can cost a quarter million dollars or more.

Smaller tubal centrifuges, again made of cast and carved metals, but of lesser cost because of their smaller sizes, can spin much faster and produce much higher gravities than the other devices, but only because of their deliberately small diameters, which keep the centrifugal forces produced within the available strength of the metals used, but also limit their use to fluids in test or extremely small production quantities.

In centrifugal devices designed to attain comparatively higher rotational speeds, another problem must be addressed, which is harmonics. In a centrifugal device, spinning so as to produce 2,000 or 3,000 multiples of gravity, and filled with extremely heavy fluid whose heavier components are being thrown outwards at greatly increased weights due to gravitational force, harmonics or out-of-phase vibrational forces can quickly cause structural failures. Rotational speeds significantly higher than 3,000 gravities further amplify the need to control harmonics.

Centrifuge device assemblies for high-speed operation must therefore achieve precise dynamic balance, and they must also be torsionally rigid, since twisting forces in a device, particularly during acceleration, can also induce destructive harmonics.

Filament Winding for Unprecedented Bursting Strength and Torsional Rigidity

In the 1960's, a critical technical review of the state of the art of high-speed, Zonal Centrifuges ("The Development of Zonal Centrifuges . . . ", National Cancer Institute Monographs, Norman G. Anderson, et al., editors, 1966) stated, in part that "filament winding," then a new technology, could be very profitably applied to the fabrication of stronger, laboratory-size zonal centrifuge rotors. This review stated:

> " . . . it is evident that higher speeds and resulting higher g fields can be produced by using circumferential wraps of fiberglass or steel wire over a liner. This technique has been used by aerospace firms for rocket motor cases and represents the simplest fabrication method. Two slightly different methods have been used to form rocket motor cases. These are (1) the balanced method, which uses sets of longitudinal and circumferential wraps such as those on the Polaris Missile case, and (2) the method of winding the cases on a helix angle where the path of the glass or wire filament is that of a geodesic. Techniques for winding vessels with openings on either end of the cylinder, such as would be required for centrifuges have also been developed for aerospace applications."

Interestingly, the present inventors' extensive review both of patents (1976 to 1998) and of product literature from all major centrifuge makers, reveals no evidence of the implementation of filament-winding technology in centrifuges, except in a very few, small laboratory size rotors, as had recommended in the reference NCI Monograph back in the 1960's. And more interestingly, no references have be found to using filament-winding, including the use of the radical new, high-strength plastic fibers, to strengthen the outer cases of large industrial centrifuges.

By the late 1990's filament winding technology has moved beyond the use of high-stress parts by the aerospace industry. Besides being used for rocket motor cases and jet turbine helicopter rotor transmission shafts, filaments winding is now being widely applied to sports equipment (canoe paddles, golf club shafts, bicycle frames) and is being actively explored for other types of manufacture as well.

To achieve unprecedented burst strength and torsional rigidity for the proposed new method for constructing centrifuge outer walls, this application therefore completes the multi-layer hybrid or sandwich construction for Density Screening type centrifuge outer walls, by laying up the outermost layer with filament-winding technology, again, not in evident use in present-day centrifuge fabrication, except for small lab rotors.

Therefore, the outermost member of this hybrid or sandwich method for constructing centrifuge outer walls is a filament-wound, bursting-strength reinforcement layer. See FIGS. 1 and 2, Parts 5, for a depiction of this final, bursting-strength component of the claimed outer wall construction method. FIGS. 1 and 2 also show all four of the layers in sequence, in a cut-away illustration of a single Density Screening outer transport wall collecting void. See also FIG. 6, for a perspective, cut-away half section view, showing these layers as built up with multiple outer wall collecting voids in a typical configuration, and FIGS. 13, 14, 19 and 20 for top views of various centrifugations of the entire hybrid/layered outer wall method.

In addition to the fiber materials cited by Anderson et al. in the late 1960's, today, for high-strength uses, filament winding has progressed far beyond the use of steel wire or fiberglass. Widespread use is now being made of fibers such as the enhanced nylon used in bullet-proof vests (Kevlar™ [trade name for aramid]), and molecular-chemical fiber products such as graphite and carbon fiber. Kevlar has a documented tensile strength up to five times that of the strongest steel alloy. Commercial carbon fibers (such as those sold by Amoco) can provide tensile strengths up to ten times that of titanium. Carbon fibers, although strongest, are also brittle; Kevlar fibers, less strong, are far more flexible. The uses of mixes of fibers to obtain ideal strength/flexibility characteristics is a maturing and commercially documented material science (See FIG. 27 for a reprint of one several American commercial vendor's fiber strengths comparison chart, against steel and titanium).

Filament winding converts the extraordinarily high tensile strength of the fibers used into hoop or bursting strength, for whatever vessel is surrounded and thereby reinforced by the fiber, usually affixed in an adhesive resin mixture. The wide range of specialty resins, combined with the available broad range of fibers and fiber mixes, is well known and available from many manufacturers. As a technology, filament winding is rapidly maturing. However, the use of filament winding to dramatically strengthen centrifuge outer collecting walls is herein claimed as both novel and non-obvious to experts in the imperforate bowl field.

Thus it became clear to the inventors that another extraordinary advantage of the hybrid technology, i.e., the multi-layered construction of centrifuge outer walls, obtained from the outermost use of filament winding, is an up to ten-fold increase in available bursting strength, without any use of metals whatsoever for strength.

Filament winding is also the technology of choice in applications where maximum resistance to twisting, or torsional resistance, is desirable. Destructive vibrations or harmonics at high rotating speed can come from many causes, and all will have to be addressed in the design and construction of individual Density Screening wall-surrounded centrifuges.

However, one source of harmonics which the outer, filament-wound layer addresses at the outset, is the torsional twisting of the centrifuge outer wall, particularly during acceleration. Jet helicopter transmission shafts, which must be ultra-stiff to transmit extremely high-torque and high-speed rotational energy to the blades, have been manufactured for many years using filament winding. The torsional rigidity imparted to Density Screening outer walls is therefore a proven added benefit, in addition to the bursting strength multiplying effect already described.

Summary of Objects and Advantages

A centrifuge whose outer wall is a sandwich of several hybrid layers, using the Density Screening outer wall method of construction, will be designed for routine operation at 5,000 to 8,000 gravities. These much higher rotational speeds are obtainable because of the synergistic sum of the various properties of the layers combined: ultra-hardness in the wear surface layer to withstand much higher gravity particle bombardment and abrasion; even weight distribution of lightweight but totally non-compressible castings in the load-transfer layer to manage balance and harmonics engineering problems; and, use of filament-winding as the outermost layer of the hybrid shell wall, to increase bursting strength for the entire assembly five to ten times beyond that of metal-walled centrifuges, while adding unprecedented torsional rigidity.

The hybrid method of construction detailed in the preceding section of this application has yielded an outer wall technology, the Density Screening method of construction, which not only benefits from all of the geometry improvements noted in pending U.S. patent application Ser. No. 09/115,527, but which can also, device by device, deliver as much as ten times more bursting strength that can a steel walled counterpart, while additionally offering the dynamic balancing, stiffness and torsional rigidity qualities required for such extremely high RPM operation. These combinations of strengths will also be achievable at far lower design and construction costs than can be attained via the metallurgical craft construction methods used in prior art.

The combined or synergistic strength features of the method of construction presented, translates to devices using the Density Screening outer wall transport method, and surrounding tubal, decanting or stack-cone cores, buildable to any practical length (for long residence time), and constructable either in larger diameters than is presently practical (thus accommodating larger volumes of fluid processing per device), or operable at considerably higher revolutions per minute, and thus producing substantially higher gravities than can be achieved at present in any devices except small-volume, batch-fed tubal centrifuges.

In combination with the diameter-reducing, long residence time-enabling, and other transport efficiency geometry advantages of the Density Screening method, this method's innovative hybrid construction approach yields a powerful and extremely flexible design methodology system which promises a harvest of multiple and significant new devices for the foreseeable future.

One additional important advantage over prior art, metal-based means of centrifuge outer wall construction relates to cost. It is anticipated that the far lower cost of laying up inexpensive PVD, CVD or other hardened wear surface parts, with comparatively inexpensive load-transfer wall or shell castings, and finally filament-winding the entire wall assembly, will quickly make possible the design and construction of centrifuges whose inner core and outer wall geometries are custom-tailored so as to provide optimized performance for even relatively low-demand, highly specialized fluid separation applications.

Especially for applications where large volume, high-gravity, or combinations of these two variables are desirable, Density Screen wall centrifuges will provide solutions where the unit cost of custom-building, or even building, conventional steel-wall decanting or disk centrifuges has never been economically viable. The inventors will be completing and filing a continuing stream of specific device and additional improvement patents, all of which shall refer back to this utility patent (method of construction) as well as to pending U.S. patent application Ser. No. 09/115,526. (geometry of the Density Screening method).

It may be of particular interest to those who study the art of invention that the fresh review of material science art described in this application was accomplished simultaneous to the inventors' review of possible improvements to centrifuge outer wall collecting geometries, and that these two studies being done concurrently yielded unusually productive results. In other words, realizations about the complementary strengths of the hybrid sandwich materials construction literally fed and made possible radical new thinking about outer wall geometry. And conversely, novel approaches being made in that outer wall geometry thinking cross-fertilized the search for exactly the right material elements to devise the strongest, most economical and most practical-to-manufacture hybrid construction outer wall.

DESCRIPTION OF DRAWINGS

FIG. 7 Table, showing various compression-load transfer casting types, as depicted in FIGS. 8 through 20, and also showing three examples of the different casting types combined with different types of centrifuge cores, as depicted in FIGS. 24, 25 and 26; Note lower-case letter codes in FIG. 7, corresponding to those on each of these cited figures.

LIST OF REFERENCE NUMERALS

Part 1 Pyramidal or conical shaped outer wall Collecting Void

Figure 1:
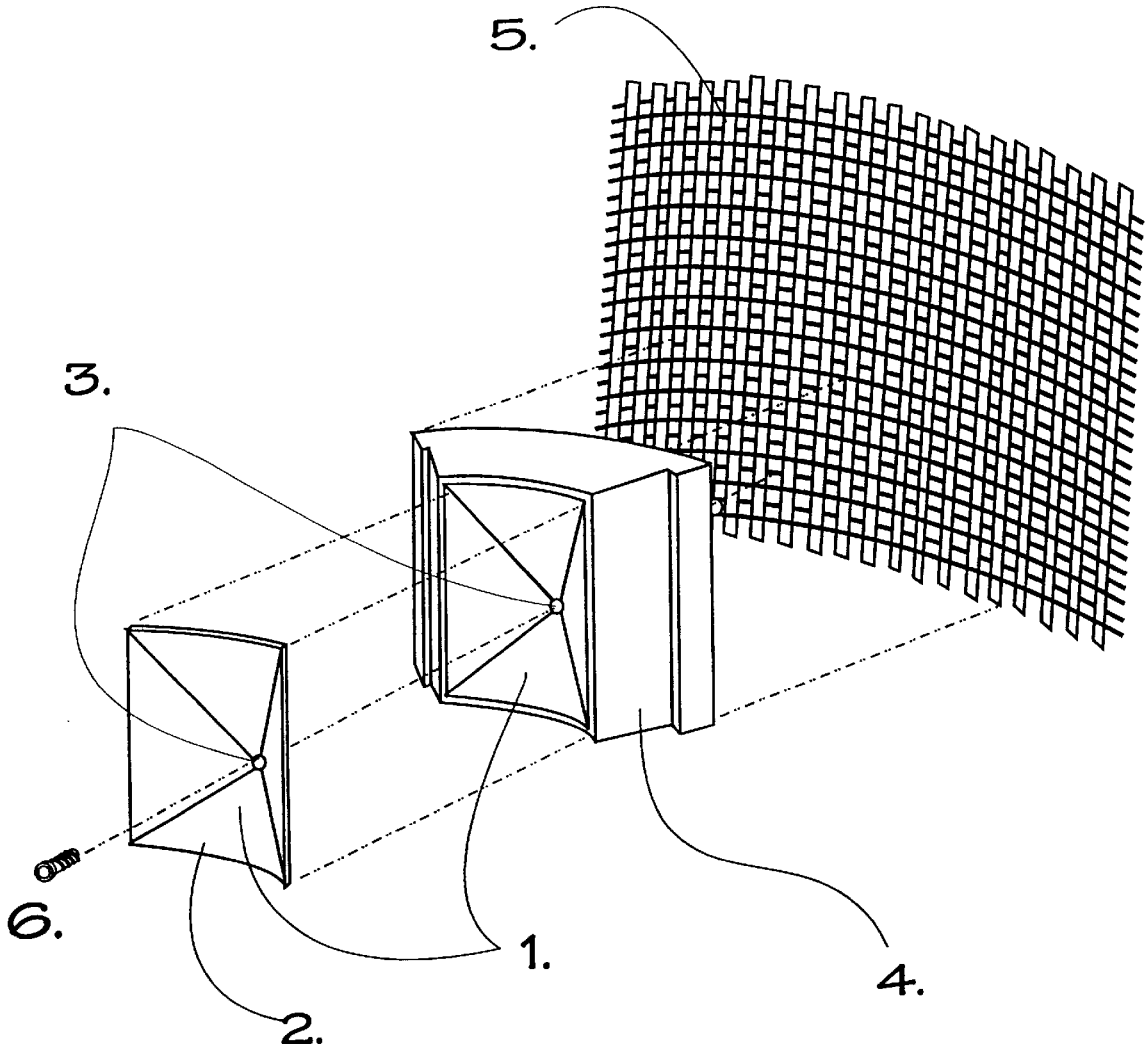
FIG. 1 Perspective view, method of construction using a combination of the three discrete means of material fabrication (hardening, [Part 2], compression-transfer casting (Part 4], and filament-winding [Part 5]), all combined as three physically distinct, concentric physical parts of a Density Screening centrifuge outer transport wall, shown in an arbitrarily cut-away view of a single collecting void.
Figure 2:
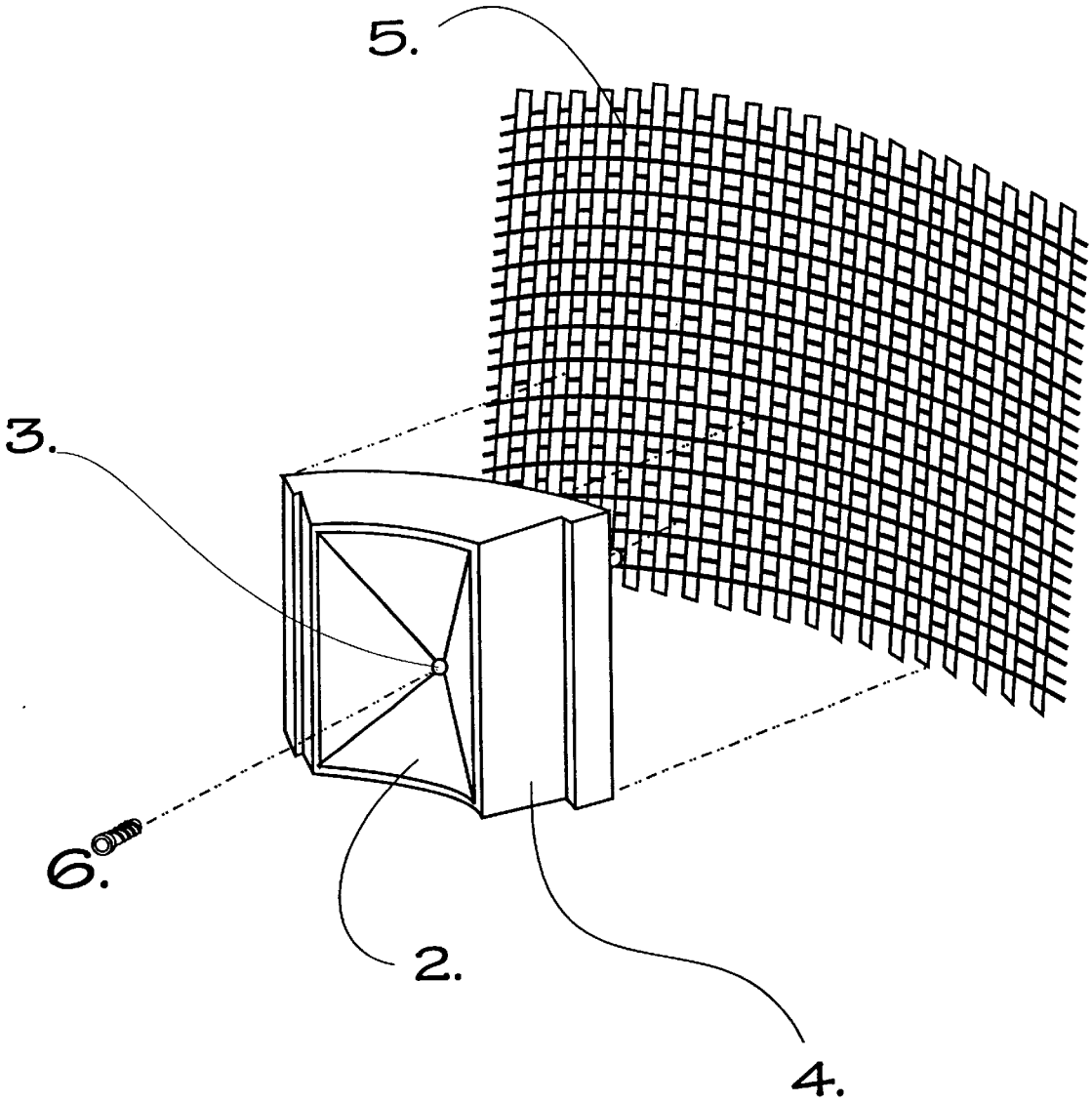
FIG. 2 Perspective view, method of construction using a combination of the three discrete means of material fabrication (hardening, [Part 2], compression-transfer casting (Part 4], and filament-winding [Part 5]), all combined, but here with the inner surface of the middle, compression load-transfer layer (the casting, Part 4) treated via PVD, CVD or other method, to create as an integral surface the first or inner, super-hard wear member (Part 2), again shown in an arbitrarily cut-away view of a single collecting void.
Figure 3:
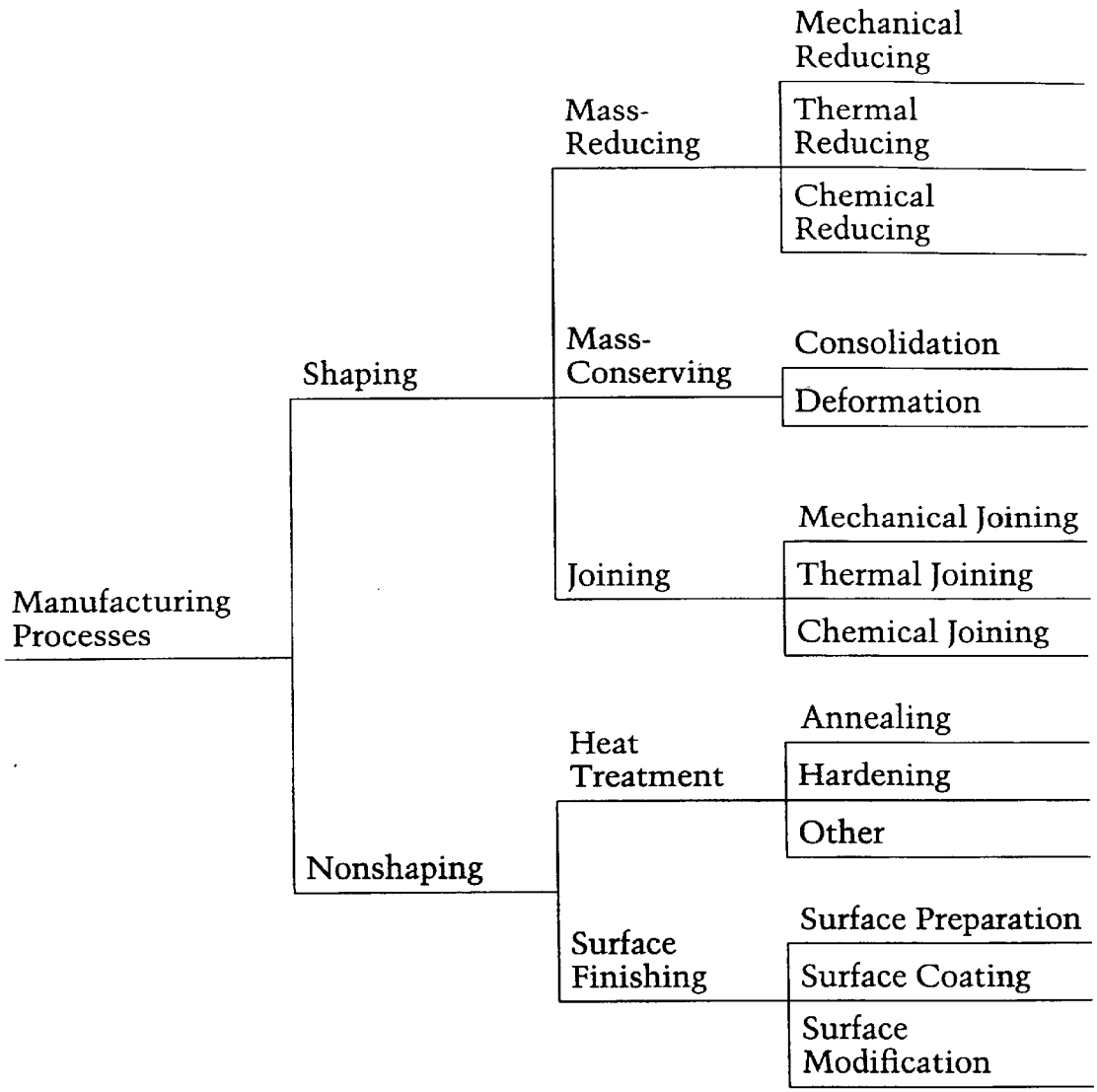
FIG. 3 Reproduction of Page 8, Fundamental Principles of Manufacturing Processes, by Robert H. Todd, Dell K. Allen and Leo Alting, Industrial Press, Inc., New York, N.Y., 1994, showing part of the author's manufacturing methods Taxonomy.
Figure 4:
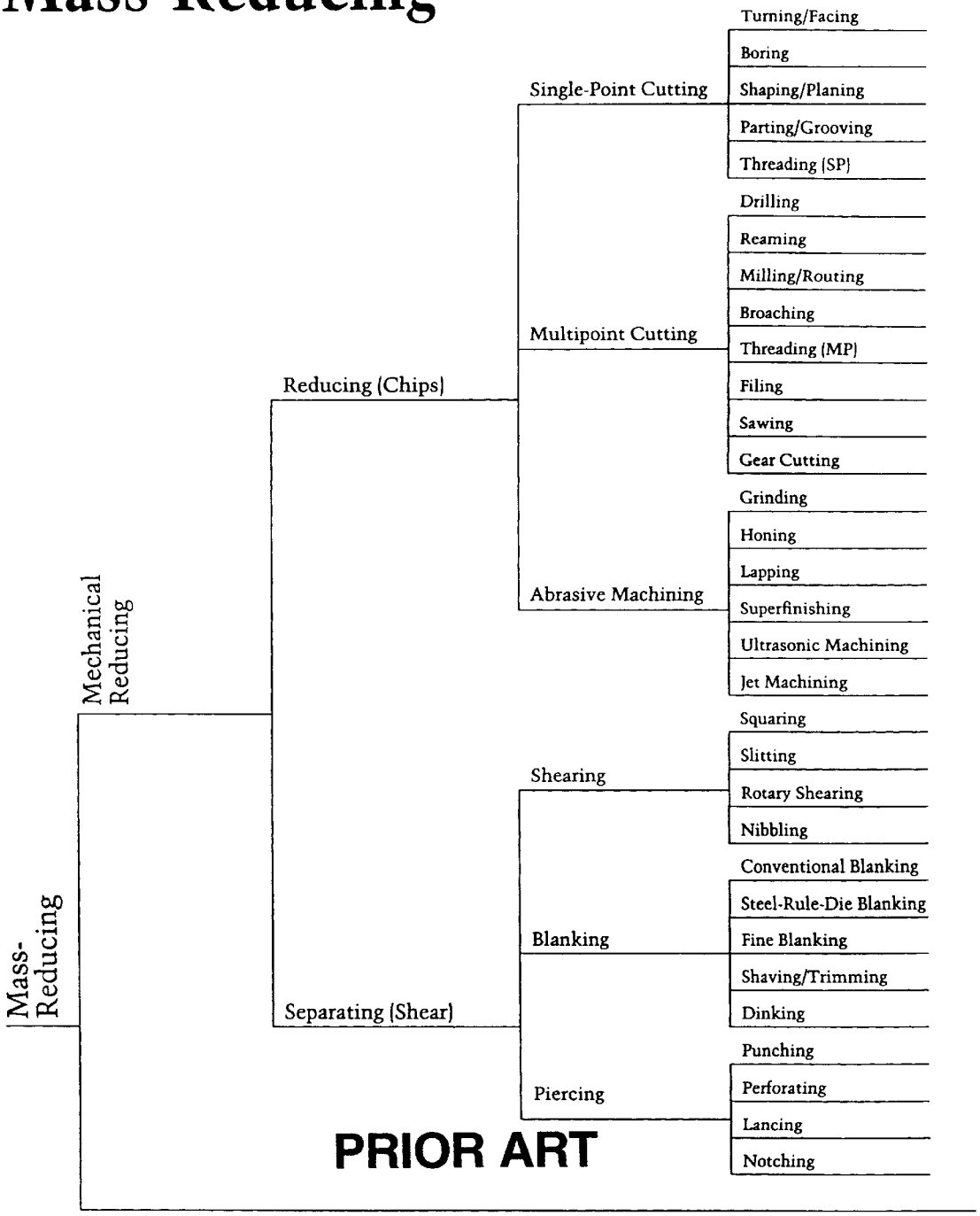
FIG. 4 Reproduction of Page 9, Todd, Allen & Alting, op. Cit., showing the traditional means for producing single-layer, metal crafted centrifuge outer walls.
Figure 5:
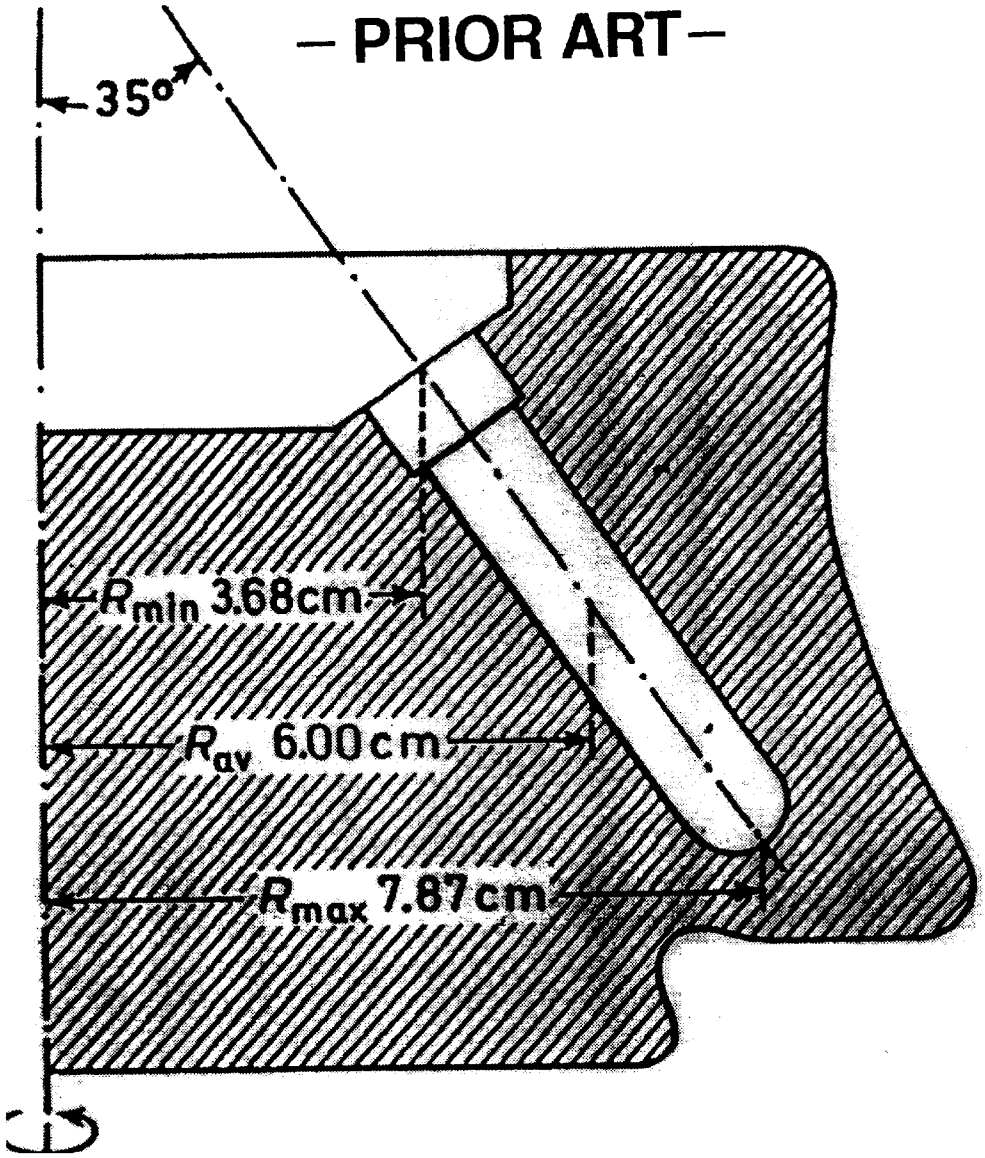
FIG. 5 Reproduction of FIG. 1.4, page 8, from Laboratory Monograph, "Ultra-centrifugation," by J. S. McCall and B. J. Potter, for purpose of illustrating how centrifugal force increases moving out from the axis of rotation.
Figure 6:
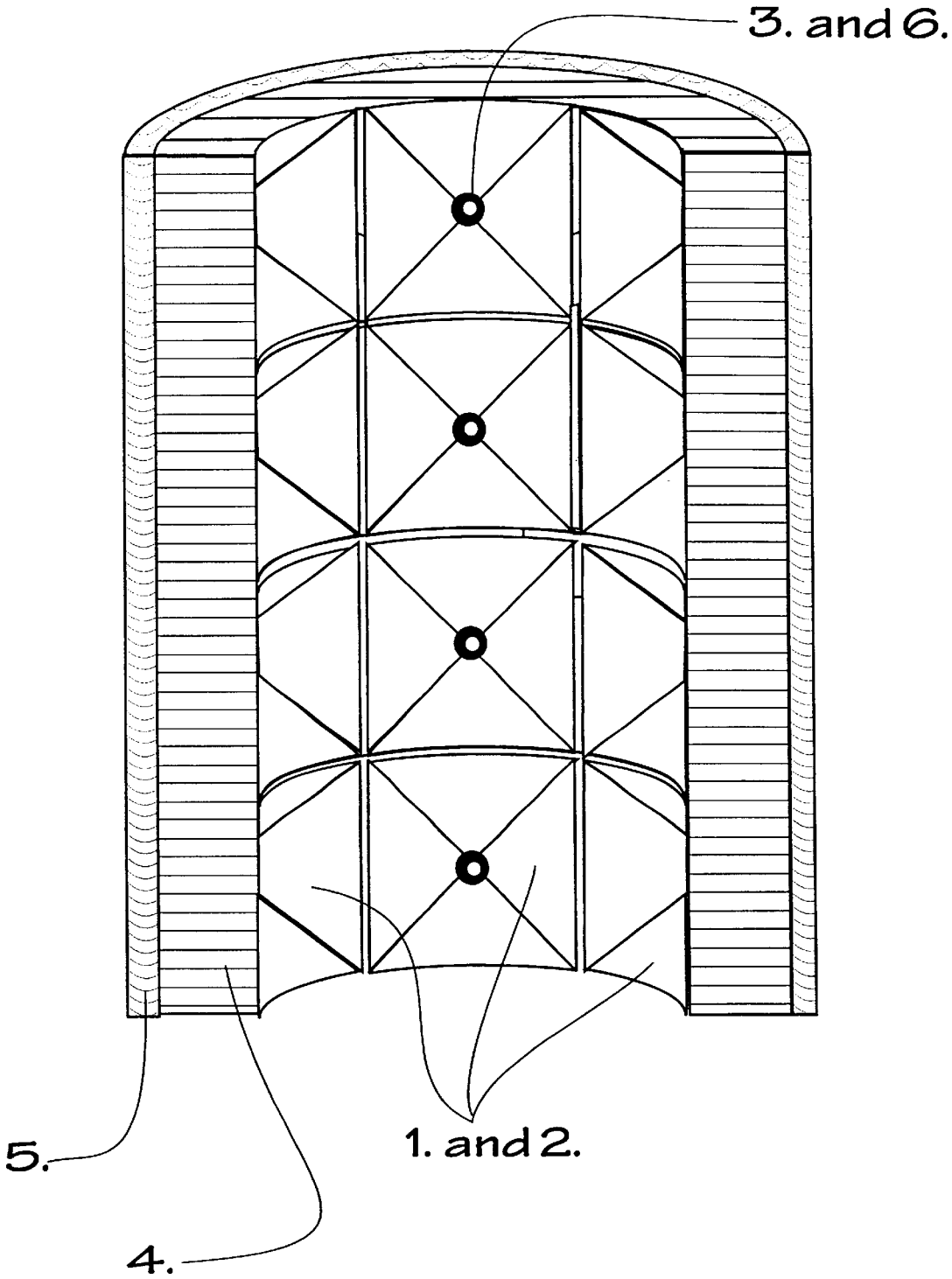
FIG. 6 Perspective, half-cut-away view, of a Density Screening centrifuge outer wall section, showing hybrid, layered-construction of the multiple collecting voids, arrayed annularly around a centrifuge's core work area.

Part 2 Hardened Wear Surface, as separately inserted tiles (shown in FIG. 1) or as a chemically deposited or metal-plated integral coating layer on the interior facing portions of the compression load-transfer casting (Part 4), (shown in FIG. 2)

Part 3 Collecting Void Orifice at apex of each pyramidal or conical collecting void Part 4 Compression load transfer casting Part 5 Filament winding outer reinforcement layer Part 6 Hardened exit nozzles to insert into and through Parts 2, 4 and 5

Part 7 Compression load transfer casting, Monolithic or One-Piece version

Part 9 Cast vertical holes to accept longitudinal bolts for connecting entire wall assembly Part 9 Cast slots to accept vanes on solid type centrifuge cores using said vanes to create vertical fluid working columns or sectors Part 10 Compression load transfer casting, Horizontally Cast Slice version Part 11 Area for installation of centrifuge core Part 12 Containment zone for ejected heavy materials Part 13 Non-rotating Outer Heavies Catchment Shell Part 14 Compression load transfer casting, Vertical version Part 15 Entry End Cap Part 16 Recessed top receptacles for longitudinal assembly bolts Part 17 Outlet End Cap Part 18 Main Fluid Entry Part 19 Path of Longitudinal Assembly Bolt(s)

Part 20 Fluid Entry Shaft

Part 21 Clarified Fluid Outlet and Transmission Shaft

Part 22 Solid Center Centrifuge Core and Anti-Vorticity, Vertical Segment Vanes Part 23 Anti-Vorticity Vanes (producing vertical fluid working columns or sectors)

Part 24 Disk Stack Centrifuge Core Assembly

DESCRIPTION OF THE INVENTION

First Embodiment—Monolithic Casting

As a significant part of the work done to develop the Density Screening outer wall transport method, the inventors have extensively reviewed late $20^{th}$ century material science from manufacturing areas entirely outside of centrifugal devices. This review of so-called new materials has led to another key feature of the Density Screening method, which is to combine in a hybrid or sandwich construction manner, three different material technologies, each ideally suited to solving selected challenges in centrifuge design and performance. FIGS. 1 and 2 illustrate the deceptively simple appearing outcome of this re-thinking.

Reading FIGS. 1 and 2 from left to right, the sequence of materials in the optimum hybrid or sandwich construction of one cut-away, pyramidal void section of a Density Screening outer wall is presented as each would be sequentially encountered by a heavy particle being thrown via centrifugal force, outwards from the spinning column of fluid, in any centrifugal device core.

Ignoring for a moment the detail of nozzles (far left, Part 6), the heavy particles being thrown outward encounter the first layer of a Density Screen outer wall, a layer known as a wear surface (Part 2). Such a surface can be a thin-stamped or cast piece of metal, ceramic or other material, or it can be achieved via a chemical transformation or metal plating of the surface of the middle (casting) layer (Part 4), such that the "wear surface" and the "compression transfer casting" are one physical piece, comprising two elements.

One surprisingly economical possibility for this innermost layer as a separate applied tile, is thin-stamped aluminum, whose facing surface is transformed prior to wall assembly into an ultra-hard coating of sapphire via Physical Vapor Deposition (PVD) or into other extremely hard surfaces via Chemical Vapor Deposition (CVD). Conversely and for a given outer wall design, the compression load-transfer (middle) layer members may be easily-cast aluminum, the inner faces of which are similarly given ultra-hardness through such surface treatments.

This innermost layer or member of the Density Screening materials hybrid or sandwich is therefore quite flexibly configurable to economically achieve extreme wear and abrasion resistance.

Regarding nozzles (extreme left, Part 6, in FIGS. 1 and 2), there are numerous ultra-hard, off-the-shelf nozzle technologies to chose from, to fit into the apex opening of each pyramidal or conical void. Such nozzles are readily available in ruby, sapphire and diamond, with many thread and other attachment variations and are offered in a broad variety of orifice sizes.

Moving outwards past the wear surface layer of the Density Screening hybrid or sandwich, next is seen the compression transfer layer or component (Part 4). Bearing in mind the extreme weight and centrifugal thrust of the heavy particles continuously bombarding the outer wall of a centrifuge, a practical means must be devised to support the thin wear surface layer by transferring the compressive loads of such bombardment along to the outer parts of the Density Screen outer wall.

Figure 15:
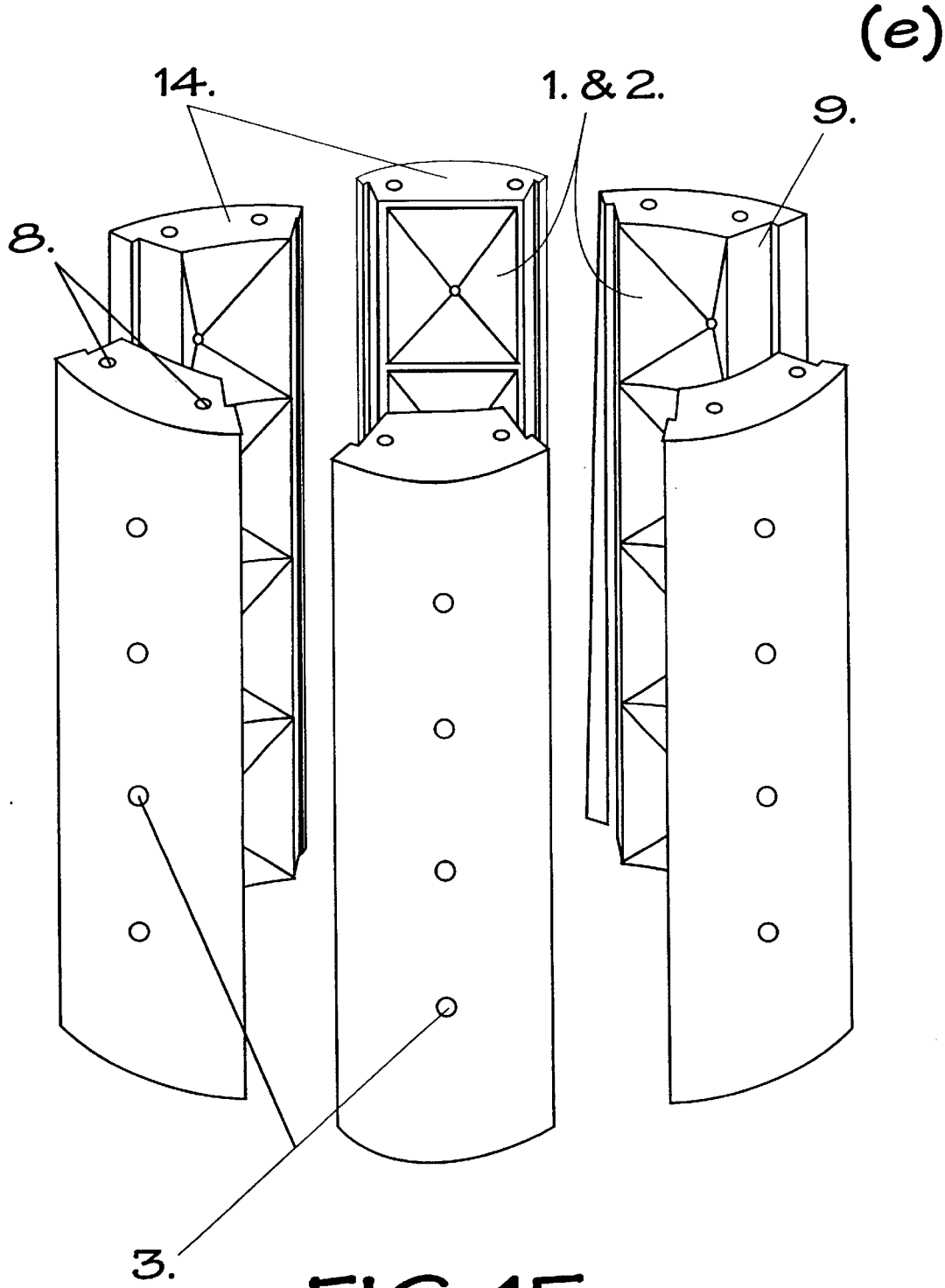
FIG. 15 Perspective view of a Vertical Type outer wall casting for the middle, or compression load-transferring member of a Density Screening outer transport wall, which vertical type castings are arranged in an interlocking circle to create the entire, enclosing outer wall (variant shown with slots to accommodate vaned solid centrifuge core).
Figure 16:
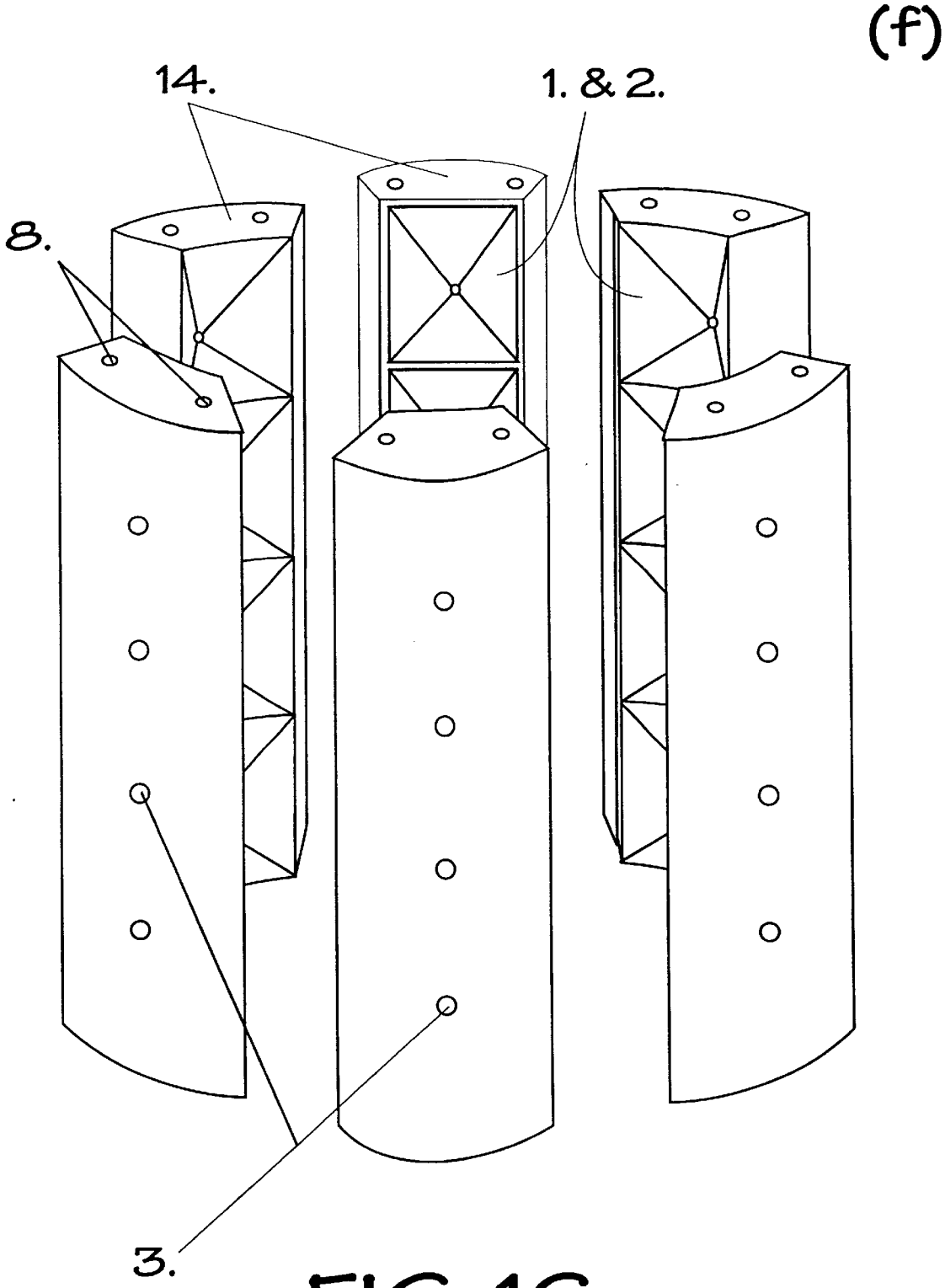
FIG. 16 Perspective view of a Vertical Type outer wall casting for the middle, or compression load-transferring member of a Density Screening outer transport wall, which vertical type castings are arranged in an interlocking circle to create the entire, enclosing outer wall (variant shown without slots, for other than vaned/solid centrifuge cores).

FIGS. 1 and 2 thus next shown an incompressible load transferring casting (Part 4), which can be fabricated to extremely accurate size, weight and density tolerances via investment casting. Investment casting of ceramic, aluminum or other materials produces parts of high precision and intricacy, whose uniform size, stiffness and density makes them intrinsically dynamically balanced, and thus ideal for centrifuge outer wall use as the compression transfer element of the sandwich. The inventors have developed several multiple void casting schemes, including fabricating multiple voids as monolithic or one-piece castings (FIGS. 8 and 9), as horizontal castings to be stacked atop one another (FIG. 12), and as vertical castings (FIGS. 15 and 16).

The primary embodiment of this method of construction is presented as the one-piece or Monolithic casting scheme. When employing Density Screening outer transport walls for very high rotational speed devices, it is anticipated that the monolithic or one-piece approach, fabricated of various materials via investment casting, will yield the greatest stiffness and torsional twist resistance. Casting the compression load-transfer casting layer in one piece, particularly for a relatively tall centrifuge core, requiring six, eight, 10 or more stacked annular bands of collecting voids, does make for the most intricate casting in the one-piece scheme, and will therefore be the most expensive to set up.

Figure 11:
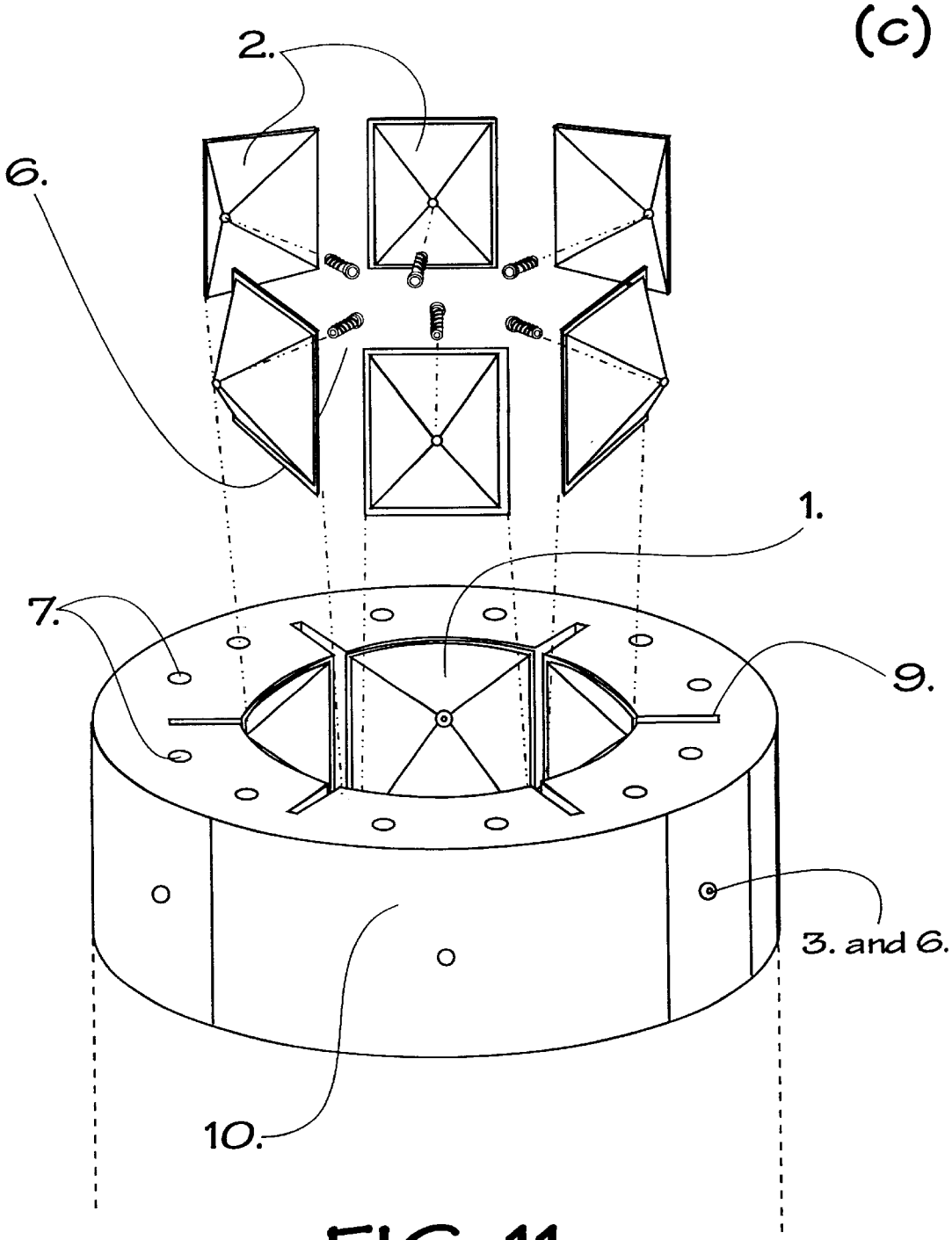
FIG. 11 Perspective view of a Horizontal Type outer wall casting for the middle, or compression load-transferring member of a Density Screening outer transport wall, showing how the hardened, wear-surface inserts (Parts 2) are applied to the inner surfaces of said wall casting. Insertable hard material nozzles (Parts 6) also shown. (on a vaned-slot variant).

As with all the casting variations presented in this application, hardened wear surface inserts may be placed so as to protect all heavy material bombardment areas of the compression load-transfer casting. FIG. 11 shows the insertion of such surfaces on a Monolithic type of such casting. Again, the interior walls of the casting itself, may, conversely, be chemically or otherwise transformed to integrally provide the desired hardened interior surfaces.

It is expected that these tall, relatively intricate castings will pay for themselves in certain higher stress applications, due to their torsional rigidity.

Moving outward (in FIGS. 1 and 2, from left to right), in the Monolithic casting embodiment of the Density Screening outer centrifuge wall, we and move on to the final and outer layer of the wall or shell, which is constructed via a late $20^{th}$ century technology means called filament winding (Part 5). Originally performed using steel wire and fiberglass, filament winding is a means for converting the tensile strength of certain wire or fibers into hoop strength by repetitively winding a vessel such as our composite centrifuge outer wall, in known patterns which produce maximum burst resistance for that vessel.

Certain recently perfected fibers, notably arymid (also called Kevlar), carbon and graphite, exhibit some of the highest tensile strengths known to science. Carbon fiber, for example, can provide a tensile strength seven to ten times higher than that of titanium, and with many more times than that afforded by any steel alloys. Numerous applications using such fibers in various ultra-high-strength applications are well documented, all outside of the centrifuge industry. Coating such fibers with various resin-binder chemicals, and then continuously winding them around the outer surface of a vessel translates these materials' very high tensile strength into extremely high bursting strength for such a container.

Thus, the outermost layer of the construction method for Density Screening is achieved through filament winding (farthest right in FIGS. 1 and 2, part 5). This part of the construction is done by applying resin-impregnated carbon, Kevlar and/or mixtures of these and other high-strength filaments as the outer wrapping, directly over the compression load-transferring casting layer.

Beyond the dramatic increase in achievable bursting strength for any given size spinning centrifugal device offered by filament winding technology, is a second major and well-documented feature of this technology, torsional stiffness. Currently, filament winding is a mature technology used to create helicopter transmission shafts, spinning jet engine components and other extremely high-stress spinning elements which must transfer rotational energies without twisting and thus resisting the development of harmonics from twist or flexion. Applying filament winding as the outer hybrid component of Density Screening outer transport walls brings not only previously unknown bursting strength but also the ability to resist and contain torsional twisting and related harmonics, an ability very much required for centrifugal devices planned to achieve the rotational speeds required to produce 5,000, 8,000 or more multiples of gravity.

As stated previously, the inventors have explored and devised multiple physical means of construction for Density Screening outer transport walls, by combining in hybrid fashion multiple material and manufacturing technologies developed across several fields of material science developed since the 1970's. To the inventors' best knowledge, none of these new, but nonetheless prior art, materials and fabrication methods, either singly or in the novel hybrid combinations to be documented in subsequent device patents, appear at all in prior centrifuge art, which relies almost exclusively on cast and carved steel, steel alloys or titanium metals for nearly all centrifuge components.

The documented tensile strength of carbon and Kevlar filaments and combinations can approach ten times that of metals conventionally used for centrifuge outer walls. Wrapping the outer surface of any Density Screening transport wall assembly with such filament yields centrifuges which will exhibit as much as ten times more burst strength than any tubal, decanter or disk centrifuges on the market, or, which could be theoretically rotated ten times faster than conventional centrifuges of equal diameter without bursting. This has the import of providing the unprecedented design flexibility, offering desirable combinations of "much larger" times "much faster" centrifugal devices in every category.

When the strength and low fabrication cost of this application are combined with outer collecting wall void geometry advantages as detailed in pending U.S. patent application Ser. No. 09/115,527 made available by this composite means of construction, it is clear that the Density Screening offers an original and substantially improved new method of heavy material transport for the entire family of spinning centrifugal devices.

Second Embodiment—Assembly of Sub-Castings

The inventors have thoroughly developed a second technique for fabricating the all-important compression load-transferring layer for Density Screening outer transport walls. This technique is to produce multiple castings and then assemble them around the centrifuge core. As with the monolithic castings, wear surface inserts protect the leading, or bombardment side of each void casting area.

Two different schemes have been developed for assembling multiple compression load-transfer castings into completed outer walls, horizontal, and vertical. Horizontal castings (FIGS. 11 and 12) offer much of the torsional rigidity of the monolithic casting means, but each of the horizontal castings is simpler to lay out, having fewer multiple intricate elements, and thus may be less expensive.

A second advantage of stacking multiple horizontal castings is the option this means affords for incorporating different slope angles and other void geometry variations from horizontal layer to horizontal layer. In other words, if for a given centrifugal separation, it were desirable to have different void slope angles in each annular horizontal layer of collecting voids, thus stacking horizontally cast layers, each of which was manufactured having different void geometries, will permit the creation of standard, interchangeable, and variable-slope parts.

This means that as a fluid moved longitudinally down a centrifuge, heavy materials being sequentially thrown from the device's center core, changing in characteristic, would meet optimized slope angles in the voids of the outer wall, which void slopes were different in each horizontal layer of the wall. Thus an end-user of such a centrifuge could maintain an inventory of horizontal castings, each with different, pre-determined void slope characteristics, and field-swap or vary the configuration of the outer collecting wall of his centrifuge at will. While such configure-in-the-field flexibility could also be obtained by purchasing and inventorying hand several monolithic type outer walls, each having pre-set, different slope combinations in various layers, this would be a far more expensive approach.

The other multiple, compression load-transfer layer casting method is Vertical (see FIGS. 15 and 16). The inventors' studies indicate that this probably is the least expensive casting scheme for initial setup, layout and molding, since each casting is simpler, i.e., contains fewer complex internal voids, as compared to the radiating hollow core design of both the horizontal and monolithic approaches. As with combination-assembly horizontal castings, vertical castings also lend themselves to easy, field-changeable and field-replaceable outer wall configurations.

Operation of the Invention

Preferred Embodiment—Monolithic Casting

The invention is a method of construction for the Density Screening multi-collecting void outer shell or wall, to enclose different types of prior art centrifuge cores. This method combines several different materials and corresponding means of fabrication to produce a three-or-four-layered outer wall whose composite or hybrid construction combines all the strengths of each of the means into the final assembly. Therefore this section, "Operation of the Invention" describes the method of fabrication or construction, which combines these several means.

All forms of this method of construction, for combining several different fabrication means in hybrid fashion to create the outer walls for centrifuges, begin with a thin stamped, castor chemically applied wear surface (shown in all Figures as Part 2), which forms the innermost of the concentric hybrid wall layers.

Moving outwards from the center to the outside, the second concentric layer of the hybrid shell, in the preferred embodiment of the invention, is the metal or ceramic-cast compression-load transfer or backing layer. Generically in FIGS. 1 and 2, this is shown in the form of arbitrarily cut-aways of a single outer wall void, as Part 4. Two versions of the preferred embodiment, Monolithic casting for the compression load transfer layer are shown as FIG. 8 and FIG. 9. These figures happen to show six circular arrays of voids stacked, one atop the other; any number of such stacked horizontal bands of voids may be cast and used, however.

Figure 8:
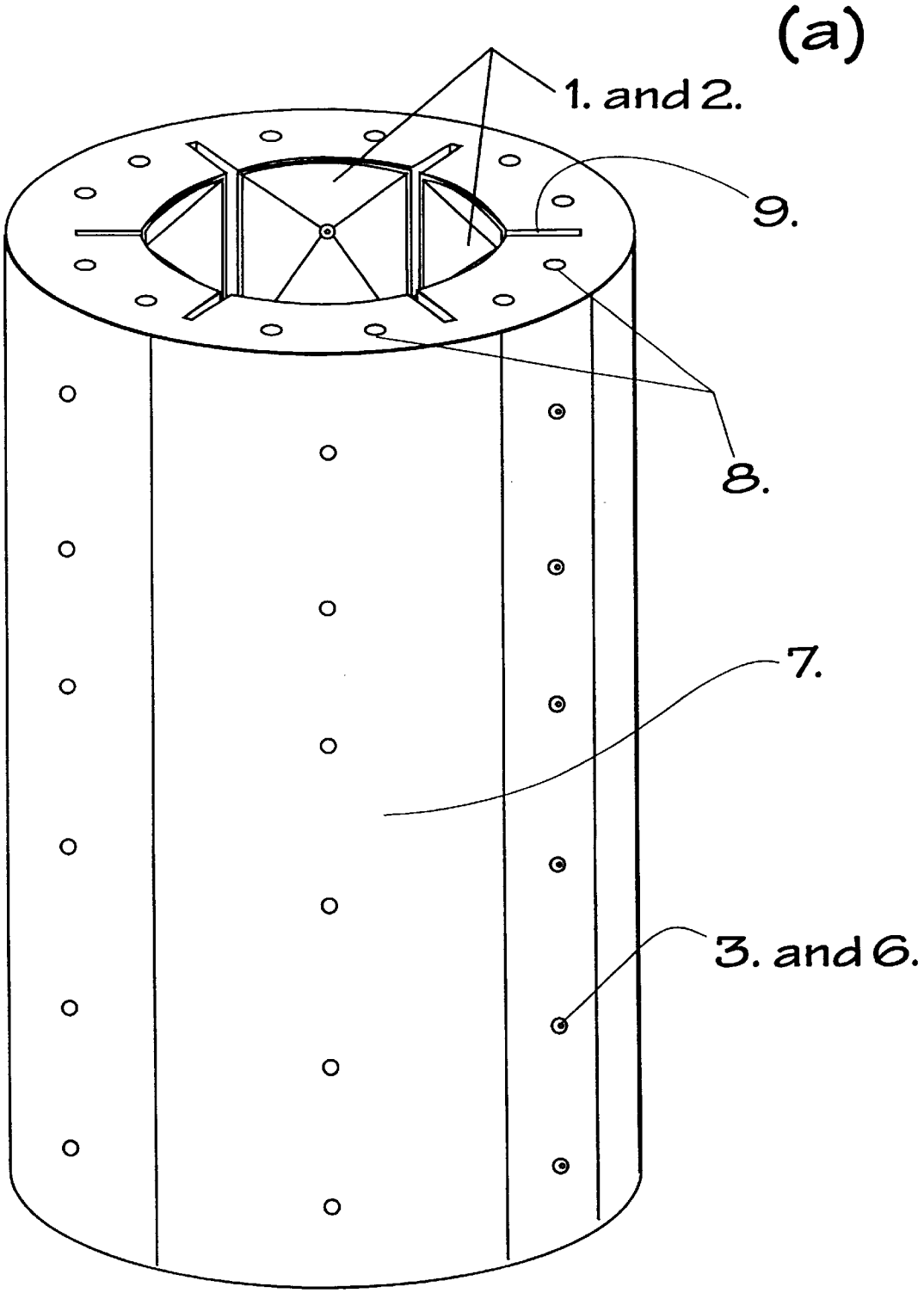
FIG. 8 Perspective view of a Monolithic or one-piece, outer wall casting for the middle, or compression load-transferring member of a Density Screening outer transport wall, for a vaned solid core centrifuge (note slots for vertical, zone-producing vanes).
Figure 10:
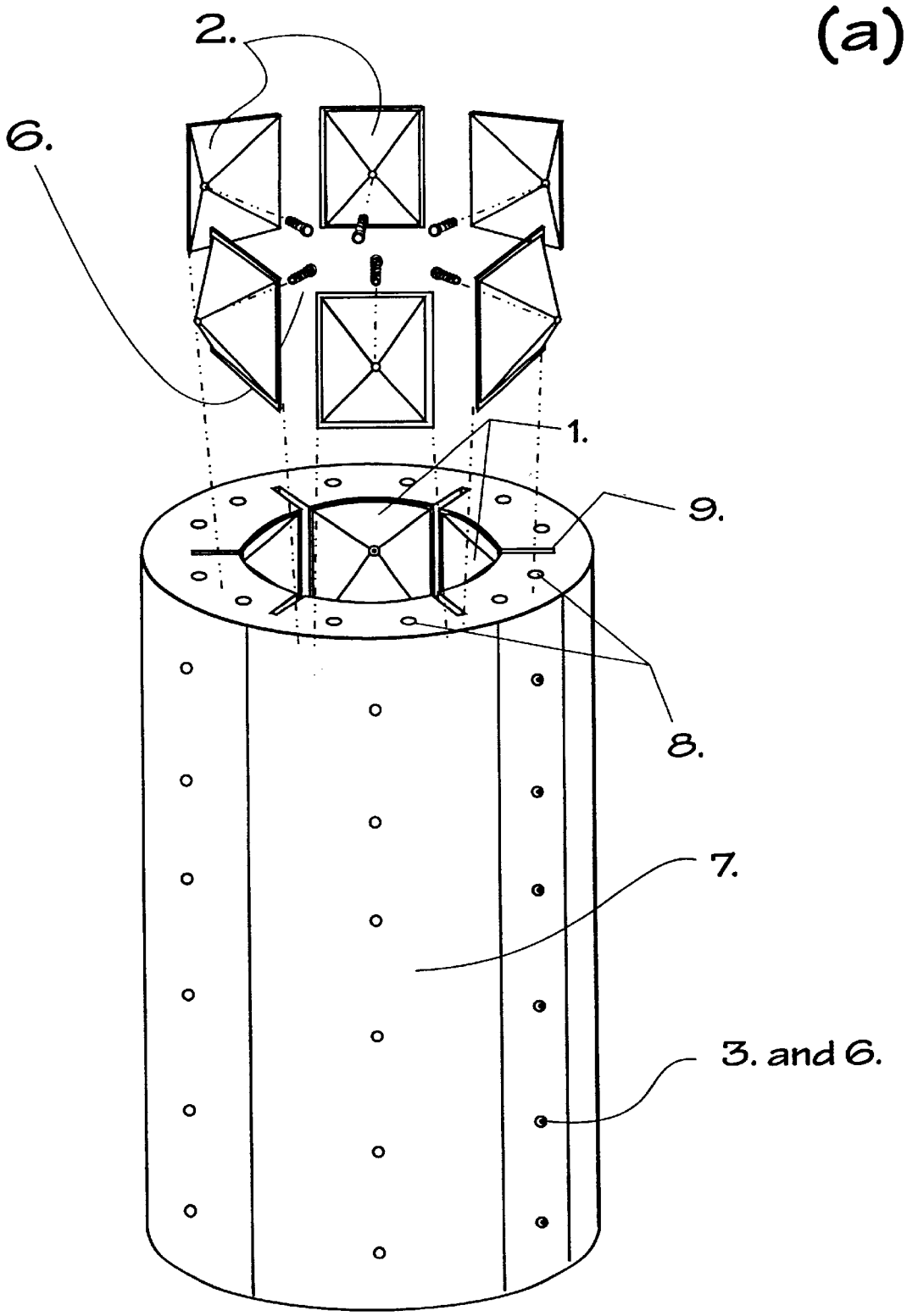
FIG. 10 Perspective view of a Monolithic or one-piece, outer wall casting for the middle, or compression load-transferring member of a Density Screening outer transport wall, showing how the hardened, wear-surface inserts (Parts 2) are applied to the inner surfaces of said wall casting (on a vane-slot version).

Parts 1 in FIG. 8 are the pyramidal or conical voids in the interior wall of the casting, while Parts 2 are the wear surface inserts or coatings that protect the interior faces of the casting. FIG. 10 shows such a monolithic casting and indicates how tile-type wear surface inserts are placed. (The interior wear surfaces can also be a layer added via chemical deposition or plating techniques). This version of such a casting also includes vertically cast slots (Parts 9), to receive the outer edges of vertical, anti-vorticity vanes attached to the center member of a solid-core type centrifuge (Part 23, in FIG. 25, illustrates such a core variant).

Figure 9:
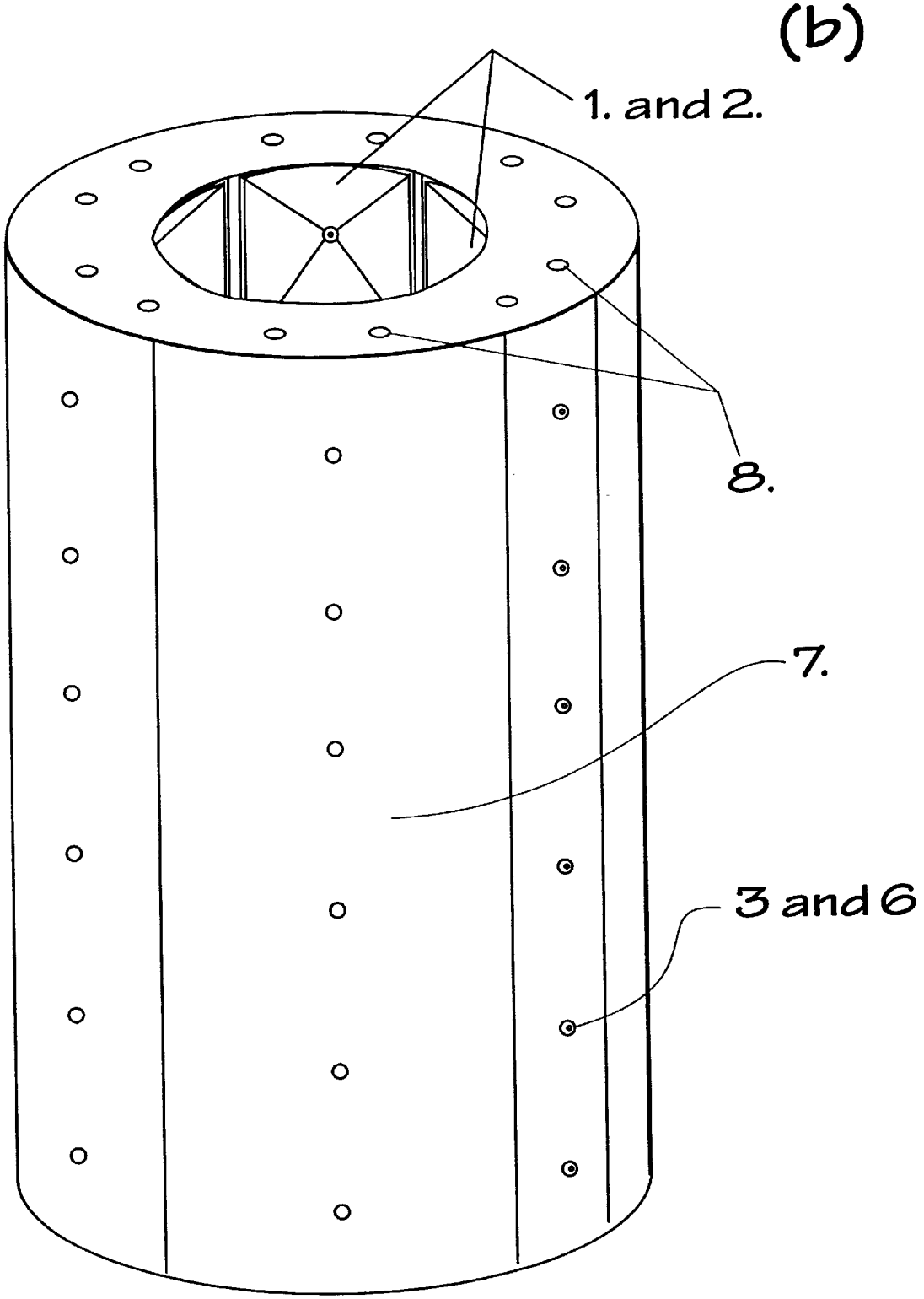
FIG. 9 Perspective view, Monolithic or one-piece, outer wall casting for the middle, or compression load-transferring member of a Density Screening outer transport wall, for a non-vaned solid center centrifuge core.
Figure 13:
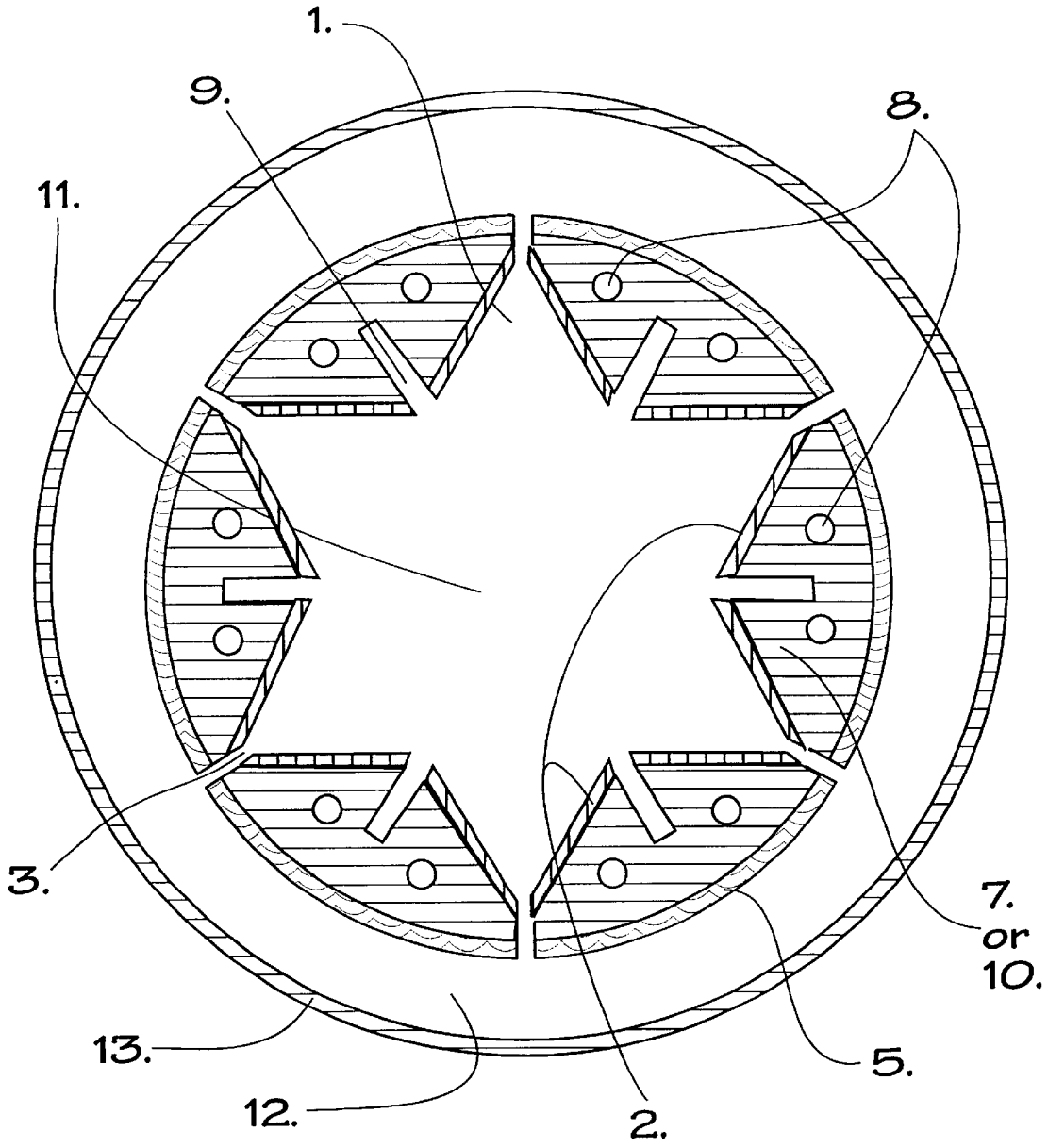
FIG. 13 Top view of FIGS. 8 and 11 (of both Monolithic and Horizontally-cast compression-load castings), with slots to accommodate the radiating vanes, vertical fluid work section areas, used on some center centrifuge cores.
Figure 24:
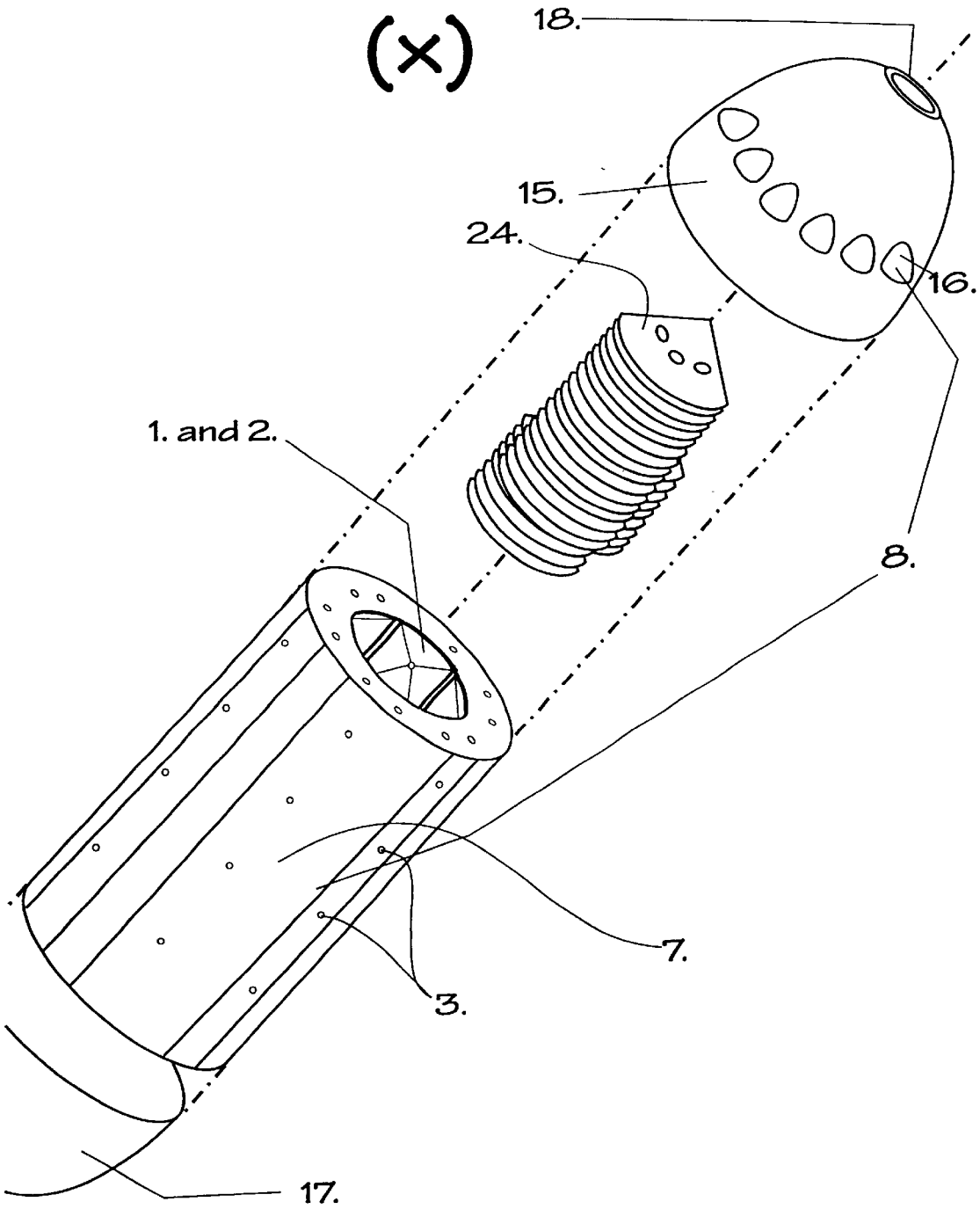
FIG. 24 Perspective, exploded view showing (from inside out): Disk-Stack type Centrifuge core (Part 24); Wear surface inserts (inside each and every pyramidal void); a single Monolithic, or one-piece compression-load transfer casting (Part 7), and top and bottom end caps (Parts 15 and 17).

FIG. 9 shows a very similar Monolithic casting of the compression load transfer layer, only without such vertically cast slots, not needed when such an outer centrifuge wall is used to enclosed other types of centrifuge cores (i.e., not having vanes). FIG. 13 shows a top view of FIG. 8, a Monolithic casting with vane insert slots. FIG. 24 shows a Monolithic compression wall transfer casting, protected by wear surface inserts or coatings on all its voids (not shown), ready for assembly with two matching diameter end caps (at the entry and outlet ends, parts 15 and 17 respectively. Note that in both end caps there are cast bolt end receptacles (Parts 8), through which longitudinal bolts are passed to secure together the end caps and the casting. (See FIGS. 8, 9 and 13 for the locations of Parts 8, the cast holes in the castings through which these longitudinal assembly bolts pass).

Figure 14:
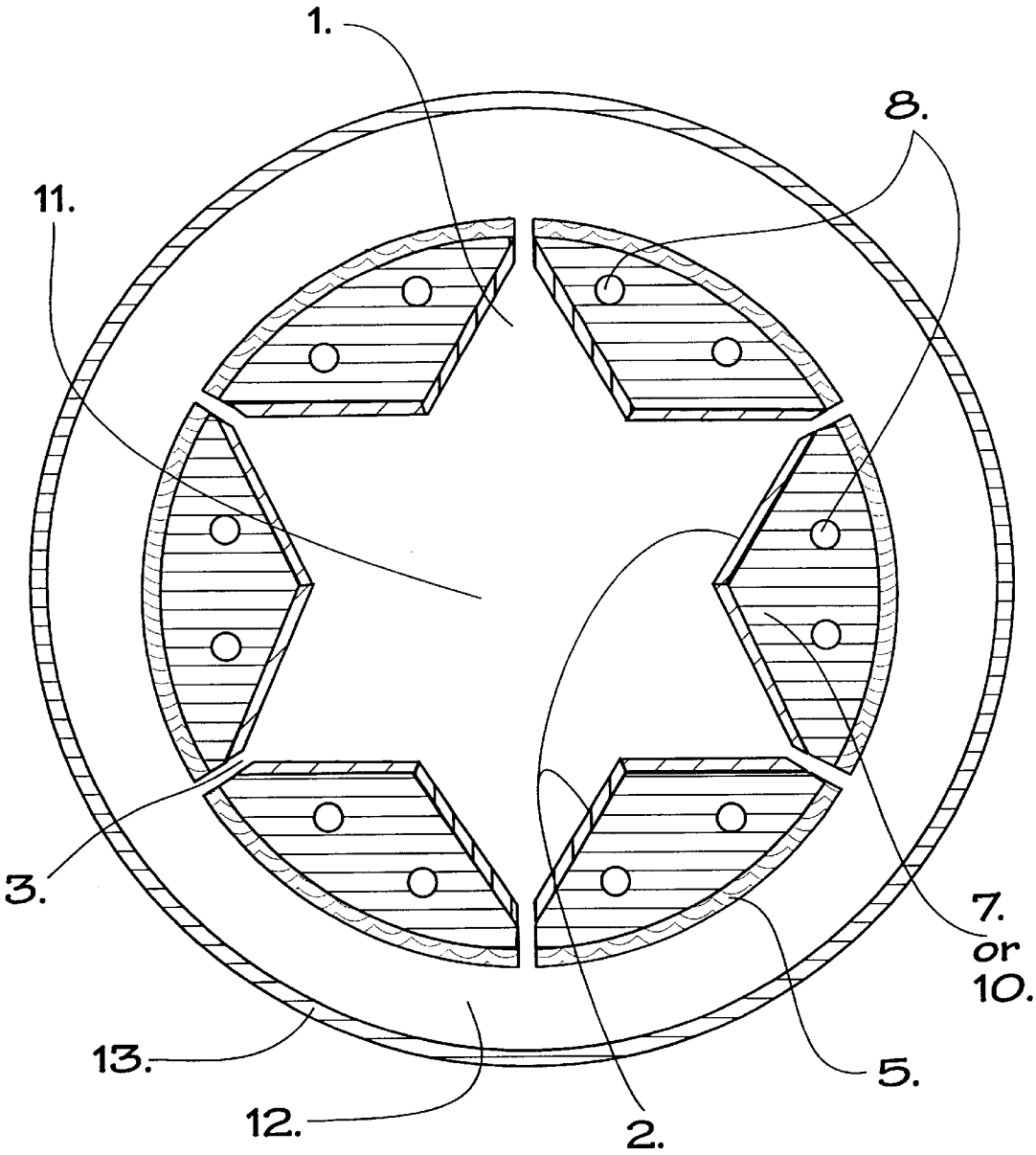
FIG. 14 Top view of FIG. 9 (actually showing both Monolithics and Horizontally-cast compression-load casting top views), with no slots to receive vanes (to accommodate stacked disk or other non-sector-vane type centrifuge cores).

FIGS. 13 and 14 also show the outermost zone and element of the assembled outer wall, which is the heavies catchment zone (Part 12) and the non-rotating outer catchment cylinder or sleeve (Part 13).

Figure 25:
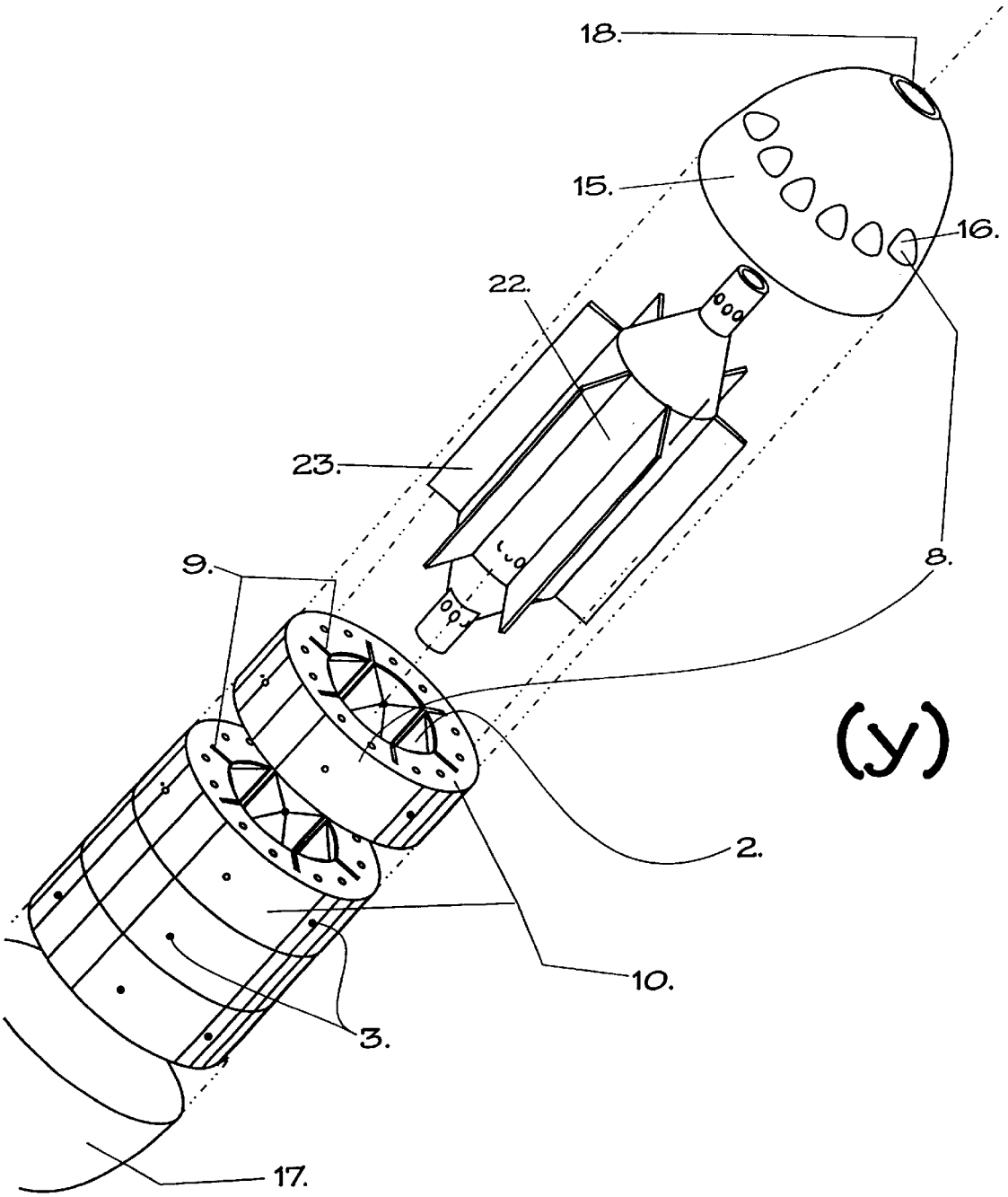
FIG. 25 Perspective, exploded view, showing (from inside out): Solid-Core, Vaned ((Vertical- sector type) centrifuge core (Part 22); Wear surface inserts (inside each and every pyramid void); four Horizontal Type compression-load transfer castings (Parts 10), and top and bottom end caps (Parts 15 and 17). Filament winding outer layer not shown.

FIG. 25 shows an exploded view of the overall assembly for one variant of this method's centrifuge outer wall construction, including the wear surface (Parts 2), which is one monolithic casting (Part 8). Such a casting by itself achieves the planned length for a given devise. This Figure also shows the longitudinal assembly bolt holes (Parts 8) included into such monolithic castings, as well the orifices (Parts 3) at the apex of each void, which orifices penetrate the castings and outer Filament Winding layer, the inlet and outlet End Caps (Parts 15 and 17), containing the end holding receptacles (Parts 16) for longitudinal assembly bolts (not shown), and a solid center centrifuge core (Part 22), which in this iteration includes vertical zone-producing anti-vorticity vanes (Parts 23). The outer, filament-winding layer which wraps the entire assembly is not shown in FIG. 24.

Alternate Embodiments—Assmebling Multiple Castings

As with the primary embodiment of this method of construction invention, the inner most file or layer of the alternate embodiments begins with the insertable or chemically deposited or plated, hardened wear surface elements. The variability of the alternate embodiments occurs in the next outermost layer, and involves the casting methods used to produce the compression load-transfer casting element for the hybrid outer wall. Two such casting element methods are claimed.

Assembly of Horizontal Castings

First, is the casting of horizontal layers of circularly arrayed collecting voids. FIG. 11 shows one such casting (Part 10), revealing the collecting voids (Parts 1), the wear surface inserts (Parts 2), and also the void apex exit orifices and nozzles (Parts 3 and 6). The horizontal casting shown in FIG. 11 includes slots (Parts 9) to receive vertical, anti-vorticity vanes from a solid-center centrifuge core.

Figure 12:
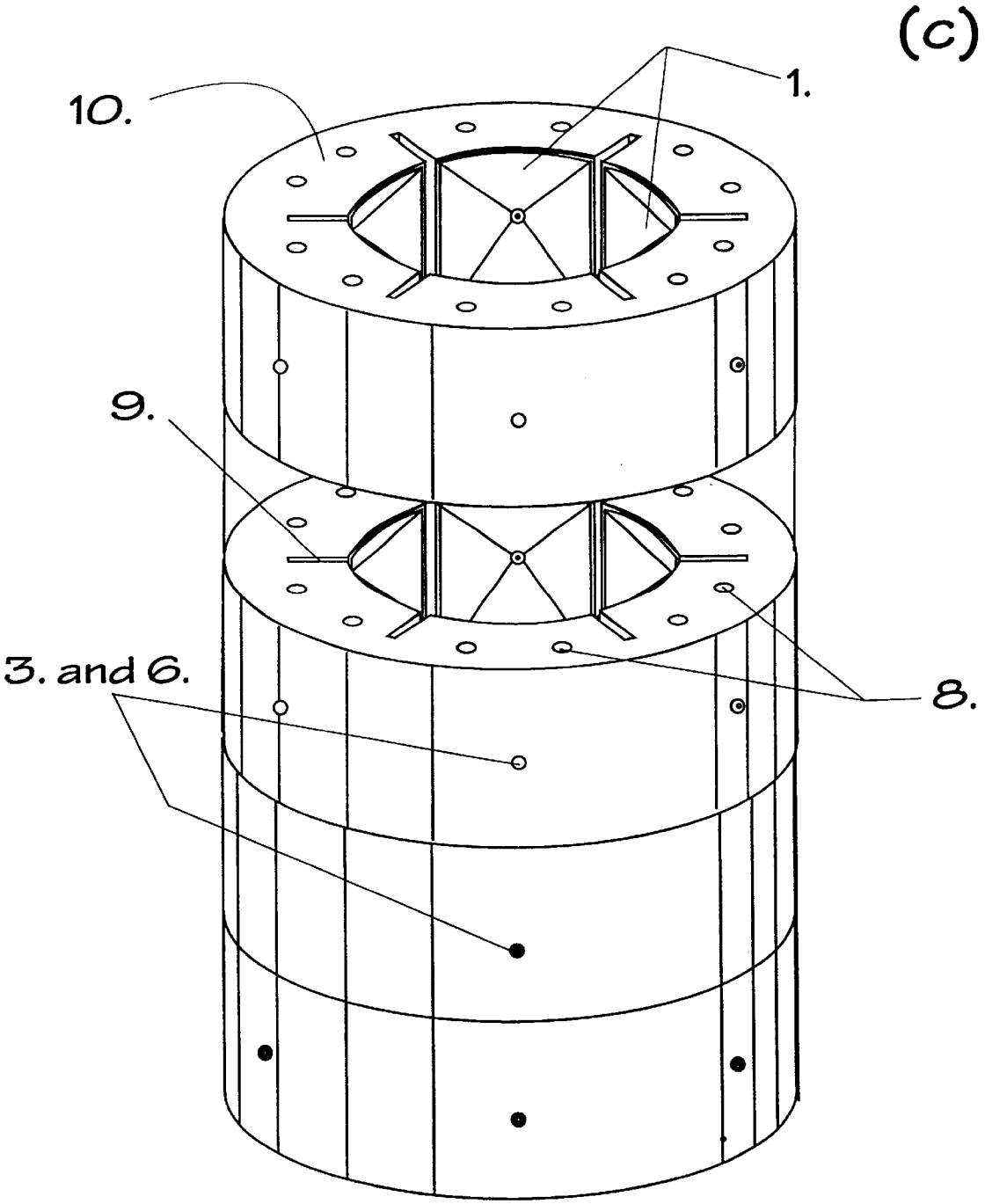
FIG. 12 Perspective view of the assembly of four horizontal type outer wall, compression-load transferring castings, showing how they can be stacked to achieve any desired device length (on a vaned-slot variant).

FIG. 12 shows the stacking of multiple such castings to achieve an outer wall of any practical length. FIGS. 13 and 14 show top views of an outer wall made up of several stacked horizontal castings (FIG. 13 shows the castings with slots to receive solid core vanes, while FIG. 14 shows the castings without such slots, Parts 7 or 10). Again, the outer heavies catchment zone (Part 12) and non-rotating outer catchment sleeve (Part 13) are also shown.

Assembly of Vertical Castings

Figure 19:
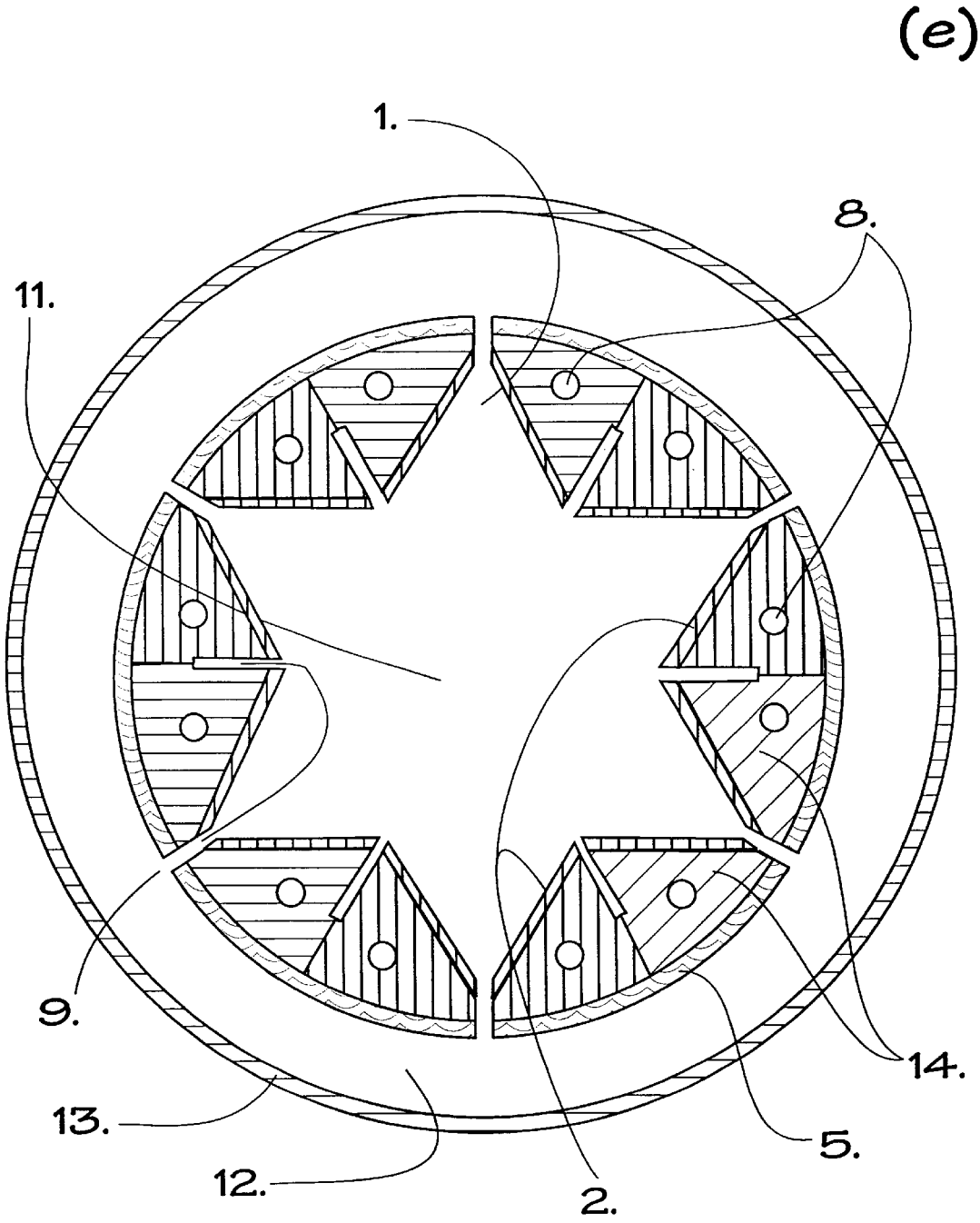
FIG. 19 Top view of FIG. 15 (Vertical type compression-load casting), with six identical vertical castings annularly combined to form a complete centrifuge outer wall, and with cast slots to accommodate vertical sector-creating vanes on a solid type centrifuge core.

The second multiple casting technique is vertical. These are placed in a circular array, such that their vertical stacks of collecting voids become annual rings of such voids. FIG. 15 shows six such castings (Parts 14), revealing the collecting voids (Parts 1), the wear surface inserts or coatings (Parts 2), and also the void apex exit voids. (Parts 3). The castings shown in this figure include the cast-in vertical slots (Parts 9) to accommodate vertical, anti-vorticity vanes attached to a solid center type centrifuge core; FIG. 19 shows a top view of these six vertical castings combined to make up an outer centrifuge wall, including the cast vane slots (again, Parts 9).

Figure 20:
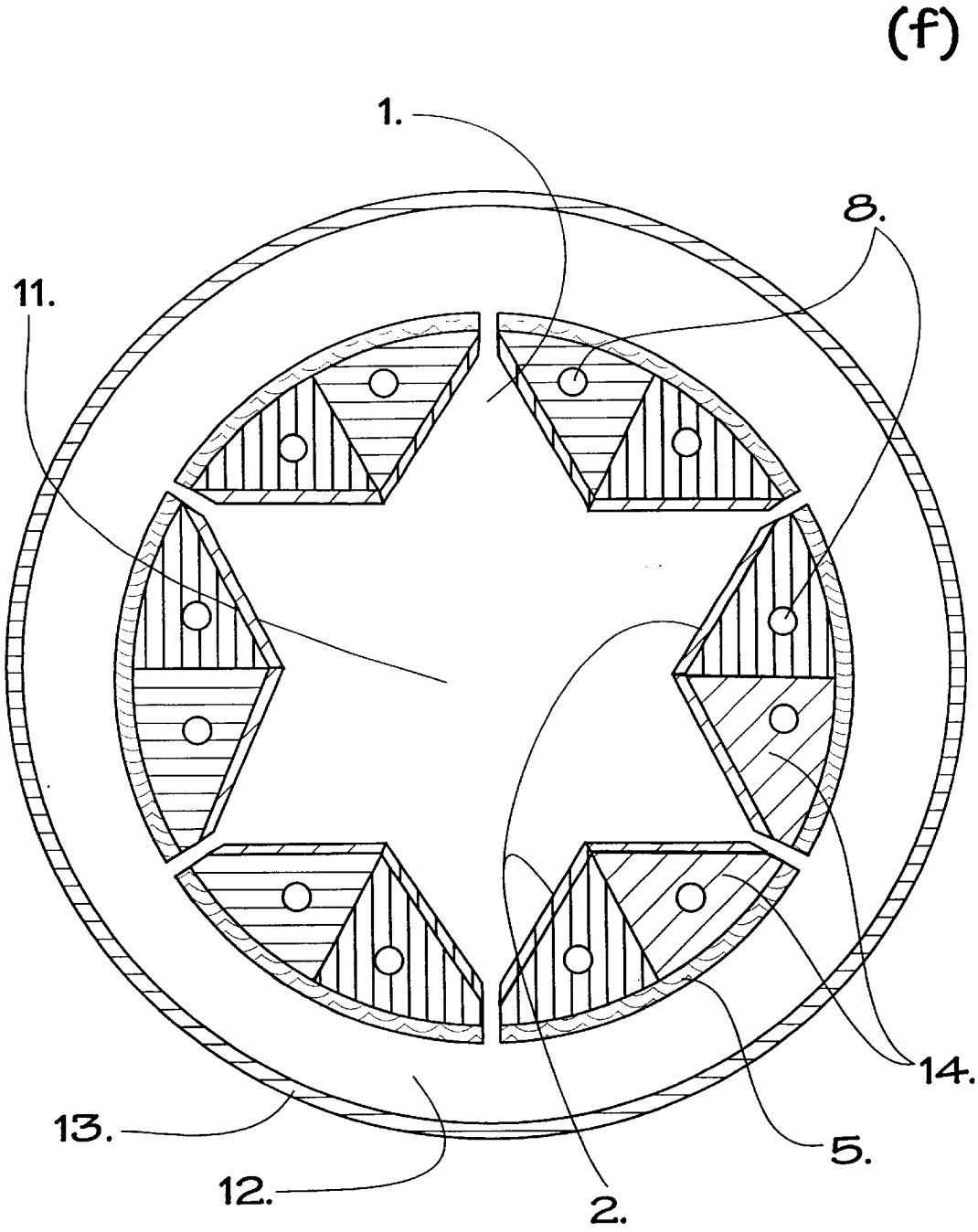
FIG. 20 Top view of FIG. 16 (Vertical type compression-load casting), with six identical vertical castings, annularly combined to form a complete centrifuge outer wall, WITHOUT cast slots (for other than radiating vanes, solid-center type centrifuge core).

FIG. 16 shows six very similar vertical castings (Parts 14), only without cast slots for vanes; such vertical castings are used to surround centrifuge cores which do not require vertical, anti-vorticity vanes. Note in both FIGS. 15 and 16 the cast vertical bolt holes (Parts 8), through which the overall wall's longitudinal assembly bolts pass. FIG. 20 shows a top view of an array of this type of vaneless, vertical casting, with six of them assembled into the outer void collecting wall for a centrifuge.

Figure 17:
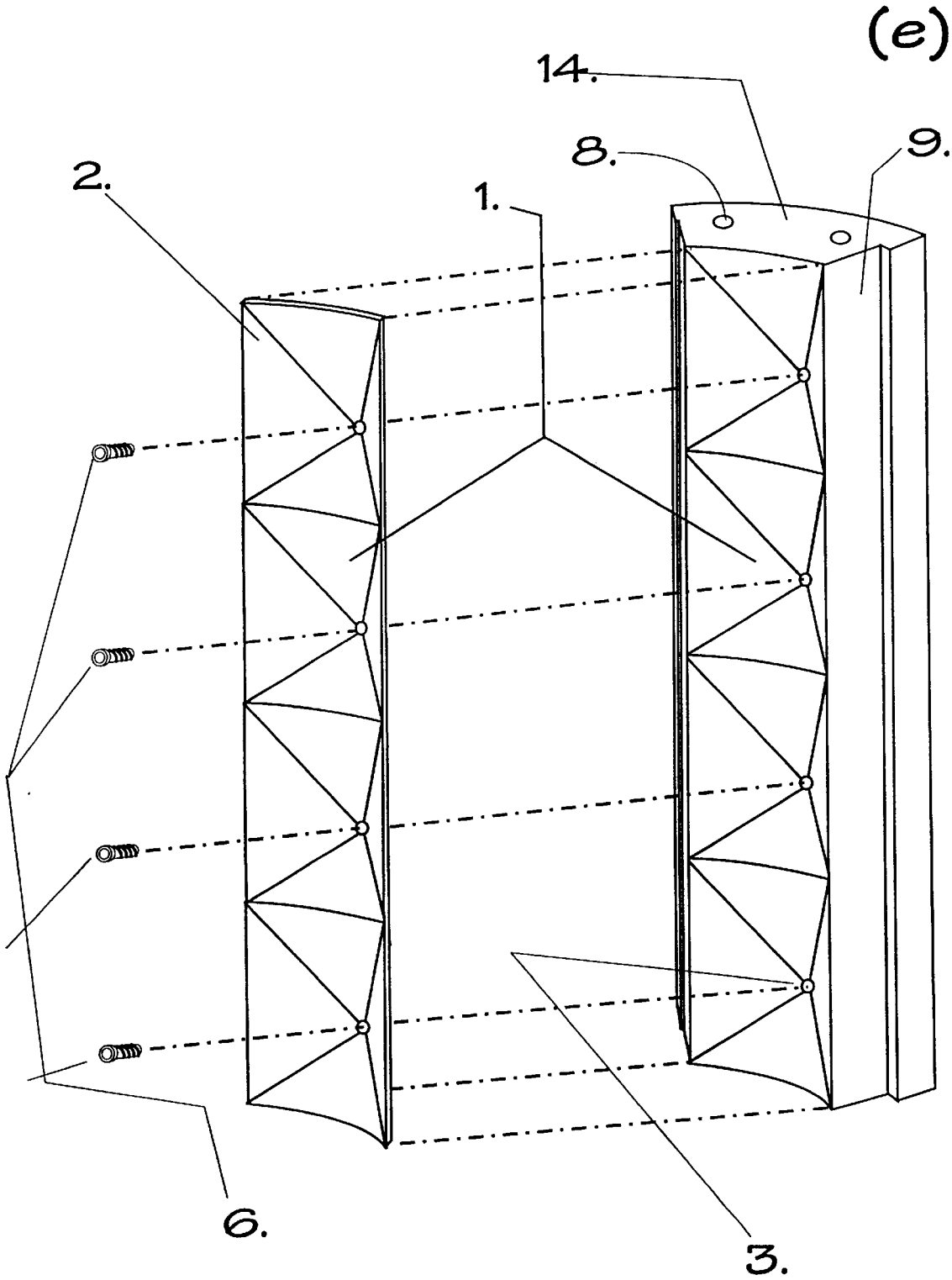
FIG. 17 Perspective view of a Vertical Type outer wall casting for the middle, or compression load-transferring member of a Density Screening outer transport wall, showing how the hardened, wear-surface inserts (Parts 2) are applied to the inner surfaces of said wall casting. Insertable hard material nozzles (Parts 6) also shown. (VANED variant shown).
Figure 18:
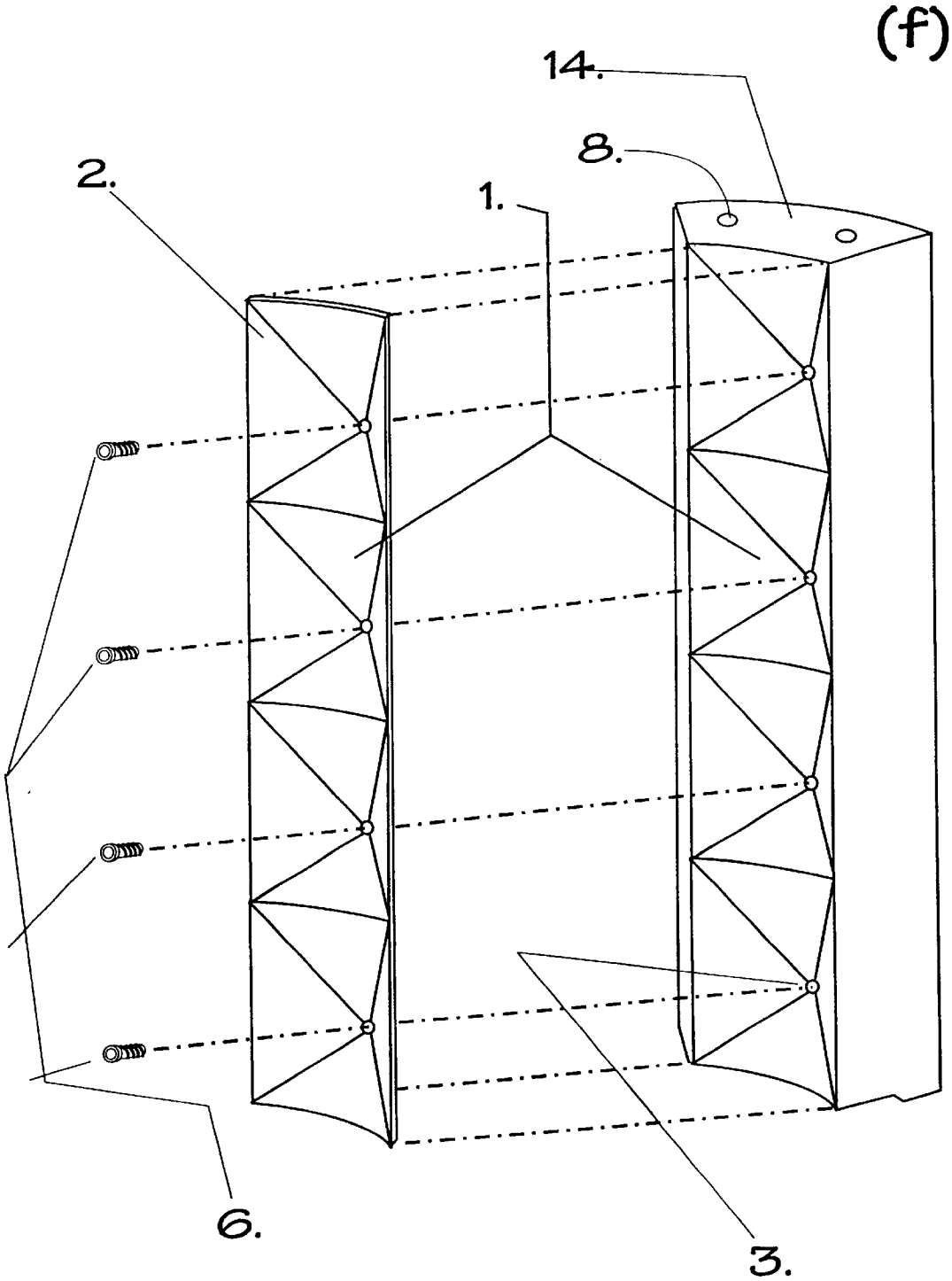
FIG. 18 Perspective view of a Vertical Type outer wall casting for the middle, or compression load-transferring member of a Density Screening outer transport wall, showing how the hardened, wear-surface inserts (Parts 2) are applied to the inner surfaces of said wall casting. Insertable hard material nozzles (Parts 6) also shown. (NON-vaned variant shown).

FIGS. 17 and 18 shows the insertion of thin stamped or cast, separate tile-type wear surfaces (Parts 2), cast or stamped with multiple connected voids to match its vertical casting member, into vane-type compression load-transfer vertical castings (Parts 14). Note the additionally insertable hard material (ruby, sapphire, diamond), off-the-shelf orifice nozzles (Parts 6). As in all embodiments, the wear surface member may also be chemically deposited or metal-plated directly on the compression transfer castings, as an alternative to the separate insertable tiles.

Examples of Completed Density Screen Assemblies

Once the wear surface inserts are attached to the Monolithic, or to the Horizontally cast or Vertically cast compression load transfer castings, and the castings are properly assembled and secured, the final filament-winding layer can be added. FIGS. 13 and 19 show top views of the wear surface plus compression load-transfer casting assemblies, in variants with slots for centrifuge core radiating vanes. FIGS. 14 and 20 show top views of wear surface plus compression load-transfer assemblies, in variations with no such slots. All four of these figures show the inner most layer of the hybrid shell wall, the wear surface layer, as a separate member (Parts 2), although this surface may be integral to the casting layer. The cylindrical outer surface of the Monolithic or of the assembled Horizontal or Vertical castings serves as the winding mold or Mandrill, around which aramid, carbon, graphite or mixtures of such ultra-strong fibers are filament wound, to impart extremely high bursting strength to the entire composite assembly.

Figure 21:
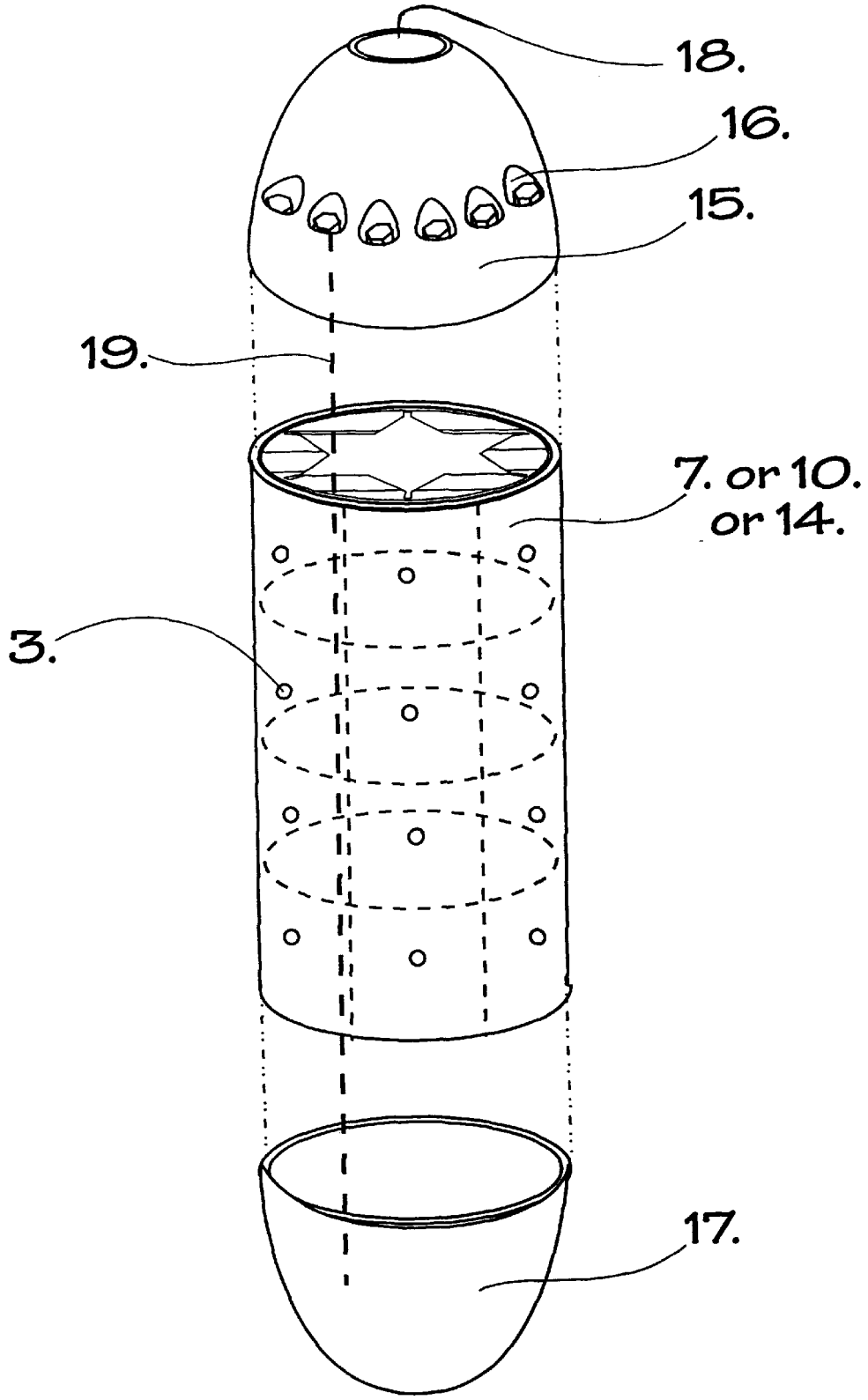
FIG. 21 Perspective, exploded view, top and bottom device-enclosing end caps (Parts 15 and 17, shown exploded away from the compression load casting layer (Part 7, 10, or 14, depending on casting type), and overall assembly bolt hold receptacles (shown only on Part 15, but also out of sight on Part 17). When the centrifuge core is enclosed by the completed hybrid outer wall (comprised of hardened wear surface inserts, compression-load transfer casting(s), and the end caps are bolted on, the entire assembly is then filament wound (see FIGS. 22 and 23, Part 5).
Figure 22:
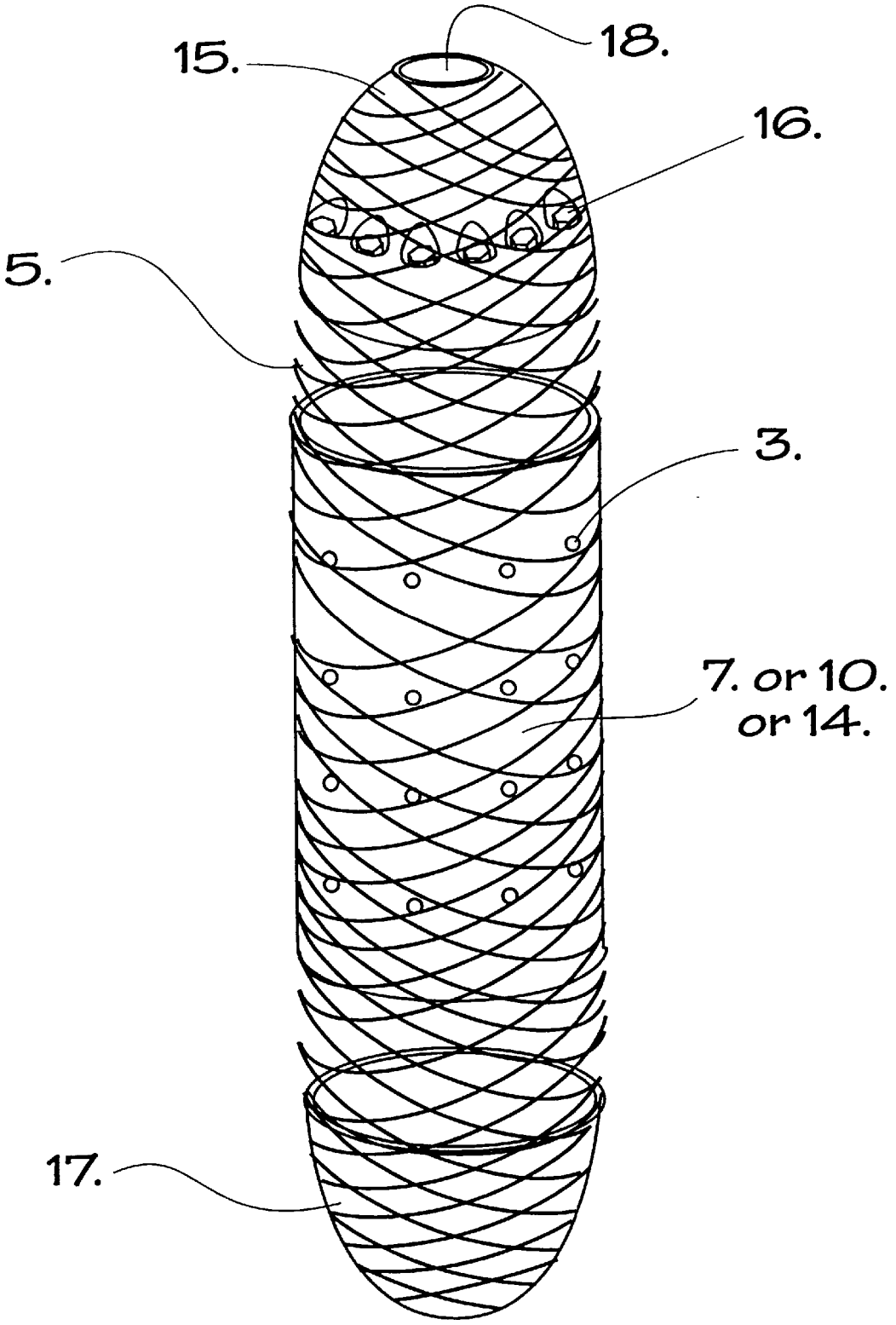
FIG. 22 Perspective, exploded view, showing same illustration as in FIG. 21, but with filament winding outer layer (Part 5) applied; Note that the actual filament winding is far more tense and tightly packed than is practical to show in any illustration.
Figure 23:
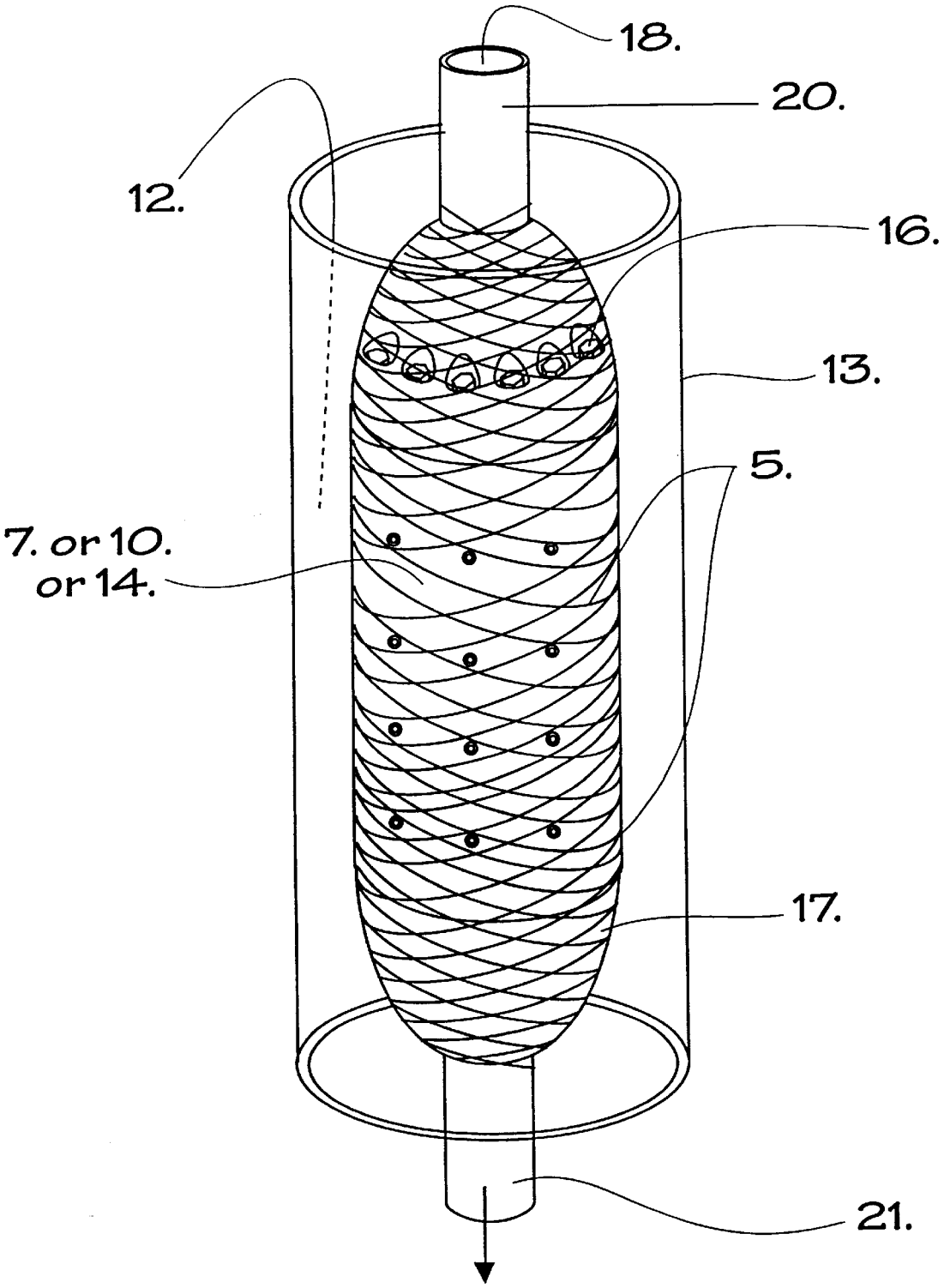
FIG. 23 Perspective view, showing non-exploded, completed centrifuge outer wall, including filament-winding and end caps, and surrounded by non-rotating, heavy material catchsment cylinder (Part 13), and with fluid inlet (Part 20) and outlet (Part 21). Part 21 also serves as the transmission shaft for rotating the device from a motor assembly (not shown).

Such fibers are wound using one of several types of specialty binding resins, which resins when cured, lock together the fibers with all other hybrid layers of the outer wall assembly. FIG. 21 shows how any of the variously configured wear surface plus casting assemblies are combined with end caps (Parts 15 and 17) prior to filament windings. FIGS. 22 and 23 show, in sparse, representational style, the filament winding layer encasing the compression load-transfer castings, which in turn carry the wear surface inserts on the interior of each collecting void facing the fluid work area.

Figure 26:
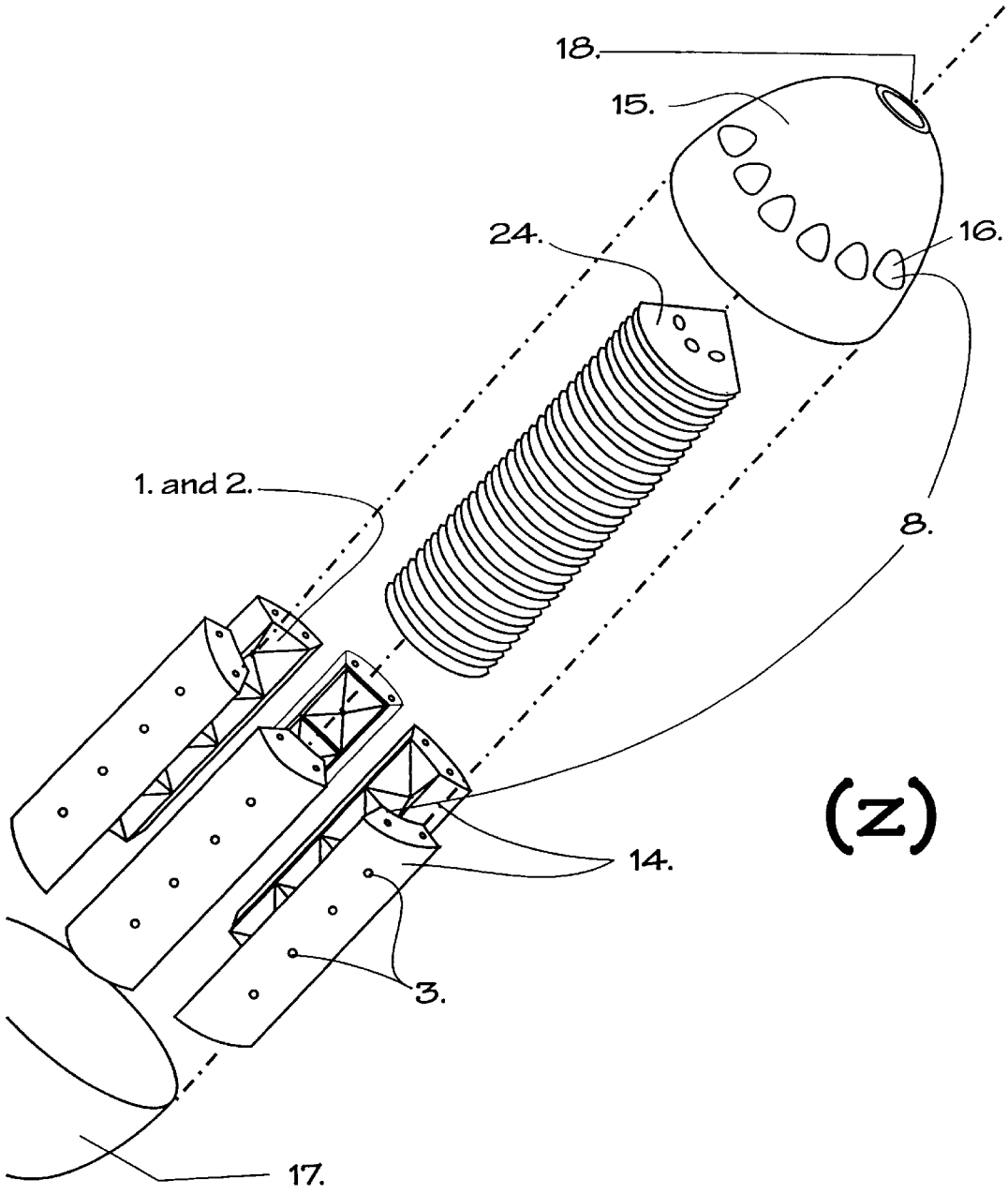
FIG. 26 Perspective, exploded view showing (from inside out): Disk-Stack type Centrifuge core (Part 24); Wear surface inserts (inside each and every pyramidal void, Parts 2); six vertically cast compression-load transfer castings (Parts 14), and top and bottom end caps (Parts 15 and 17).
Figure 27:
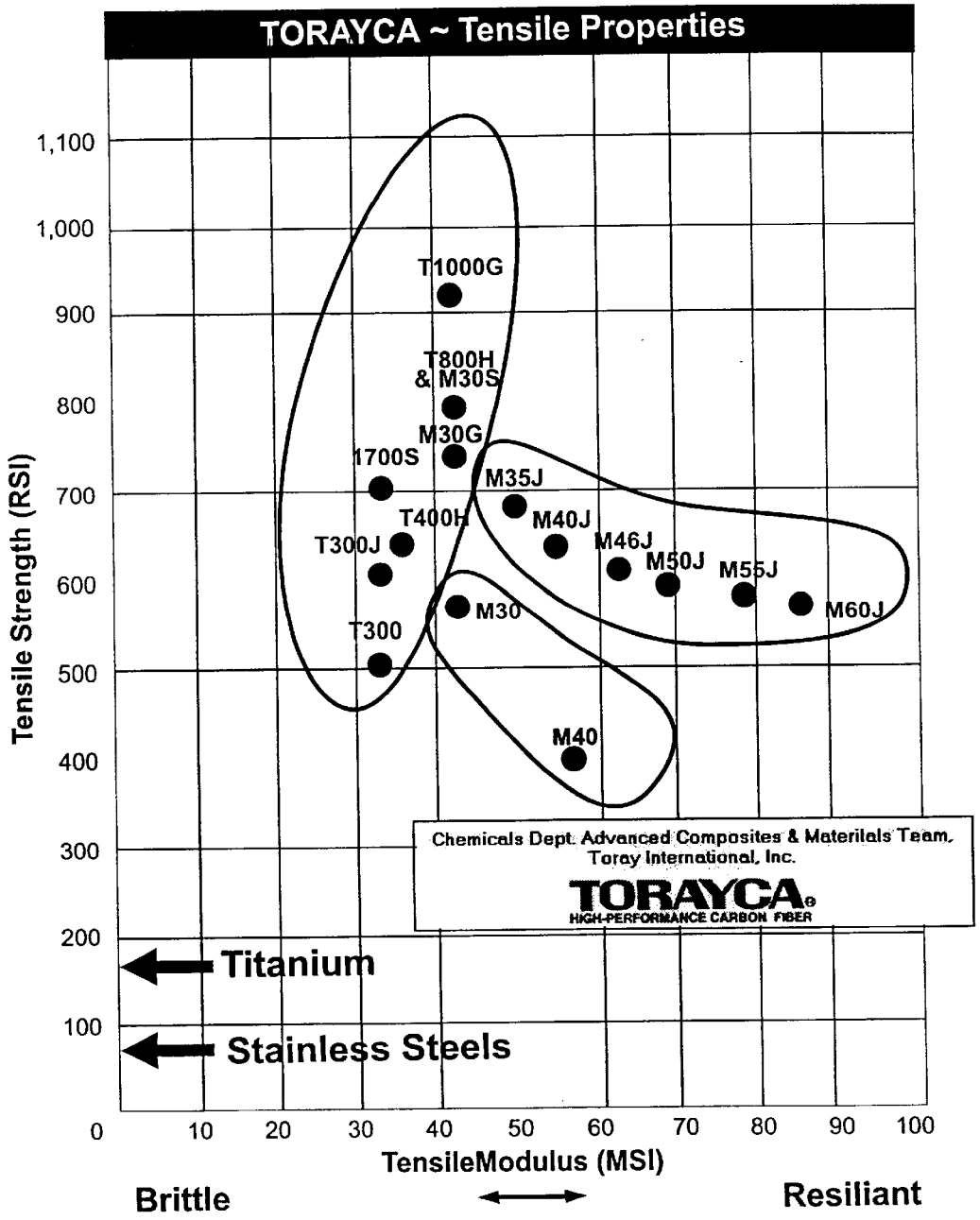
FIG. 27 Reproduction of Product Literature, from Torayca Division, Toray Interntional, Inc., showing relative tensile strength spread of various filament winding fiber products against the tensile strength of Titanium and stainless steel.

FIGS. 24, 25 and 26 show exploded views of the overall assembly of three different centrifuge outer walls, surrounding different types of centrifuge cores. These figures all include the wear surfaces (Parts 2), the compression load-transfer castings (Monolithic in FIG. 23, Horizontal castings stacked in FIG. 24, and Vertical castings joined in FIG. 25). All these figures also show the longitudinal assembly bolt holes (Parts 8) included into each horizontal casting, the orifice (Parts 3) at the apex of each void, which orifice penetrates both the castings and the filament winding outer layer, the inlet and outlet End Caps (Parts 15 and 17), containing the end cap, bolt-holding receptacles (Parts 16) for the longitudinal assembly bolts (not shown), and centrifuge core (FIGS. 24 and 26 show a Disk Stack core [Part 24]), while FIG. 25 shows a solid center core (Part 22) in an iteration that includes anti-vorticity vanes (Parts 23) used to create vertical fluid working sectors).

Conclusions, Ramifications and Scope of Invention

Centrifuges for separating materials from fluids in comparatively high volumes, i.e., over 10 gallons per minute, have traditionally been metal crafted. Such centrifuge types notably are Disk Centrifuges and Decanter Centrifuges. The present invention, a method of combining several radically different material and construction means in several layers of a hybrid or composite outer centrifuge wall, replaces the use of cast and machined metal for such walls. This replacement leads to new centrifuge geometries, to much less expensive outer wall design and fabrication, to the production of centrifuges which can routinely contain the physical stresses of operation at up to 8,000 gravities of centrifugal force, and which can do so in volumes which the resulting composite wall can contain up to 300 to 500 gallons per minute.

Centrifuges are still used in municipal wastewater treatment, in the production of many industrial products, and extensively in the petrochemical industry. However, for high-volume, very high speed centrifuges to be of economic use in wastewater, and for them to be applied at all for large volume point-of-supply water treatment, breakthroughs in strength, geometry, cost and mechanical elegance (which translates into low maintenance) are required. The method of construction hereby claimed goes to this exact industrial target, the separation of large volumes of fluid, and the extraction of very small, light particles from such volumes. Together with the inventors' geometry claims, this application for method of construction supplies a significant new answer to the evolution of centrifuges for environmental use.

We claim:

1. A method for constructing a outer collecting wall of a centrifuge in concentric layers by combining three different means of fabrication, comprising the steps of:

a) designing and fabricating the innermost layer, which is that portion of the centrifuge's outer collecting wall that is in direct communication with a fluid working area of the centrifuge using thin cast or stamped tile members which have been wears-surface-treated to create a wears surface, the wears surface being the surface which is in direct communication with fluid from the fluid working area;

b) designing and fabricating the middle layer of the centrifuge's outer collecting wall, which is that portion of the centrifuge wall which supports the innermost layer to transfer outwards compression loads created by centrifugal force and relatively heavy materials striking said wear surface, the middle layer being made of relatively lightweight but incompressible metal, ceramic or other incompressible material castings;

c) designing and fabricating the outermost layer of the centrifuge's outer collecting wall for achieving relatively high hoop strength, by filament winding the centrifuge's entire outer collecting wall with fibers from the group consisting of; graphite fibers, carbon fibers, aramid fibers, any other fibers having a tensile strength greater than or equal to titanium, or combinations of any or all of these fibers; and whereby unique structural virtues of the three means of construction of the centrifuge's outer collecting wall are selected to best satisfy differing structural needs of each layer and then are combined so that the centrifuge's outer collecting wall achieves relatively high wear resistance for the innermost layer, optimum compression-transfer, shape holding, dynamic balance and dimensional uniformity for the middle layer, and relatively high hoop strength for the outermost layer which creates a relatively high hoop strength for the centrifuge's entire outer collecting wall.

2. A method for constructing a outer collecting wall of a centrifuge in concentric layers by combining three different means of fabrication, comprising the steps of:

a) designing and fabricating the innermost layer, which is that portion of the centrifuge's outer collecting wall that is in direct communication with a fluid working area of the centrifuge by chemical disposition or metal plating directly on to a middle layer to create an integral, hardened innermost layer wear surface directly on the middle layer;

b) designing and fabricating the middle layer to transfer outwards compression loads created by centrifugal force and relatively heavy materials striking said innermost layer wear surface, the middle layer being made of relatively lightweight but incompressible metal, ceramic or other incompressible material castings;

c) designing and fabricating the outermost layer of the centrifuge's outer collecting wall for achieving relatively high hoop strength, by filament winding the centrifuge's entire outer collecting wall with fibers from the group consisting of graphite fibers, carbon fibers, aramid fibers, any other fibers having a tensile strength greater than or equal to titanium, or combinations of any or all of these fibers; and whereby unique structural virtues of the three means of construction of the centrifuge's outer collecting wall are selected to best satisfy differing structural needs of each layer and then are combined so that the centrifuge's outer collecting wall achieves relatively high wear resistance for the innermost layer, optimum compression-transfer, shape holding, dynamic balance and dimensional uniformity for the middle layer, and relatively high hoop strength for the outermost layer which creates a relatively high hoop strength for the centrifuge's entire outer collecting wall.

*3. A centrifuge having an outer collecting wall, comprising:*

*a centrifuge core disposed within the outer collecting wall;*

*the outer collecting wall disposed within a non-rotating sleeve with a containment zone for heavy materials disposed therebetween;*

*the outer collecting wall including a wear layer, a middle layer and an outer reinforcement layer;*

*at least one exit nozzle having a generally apex configuration extending through the wear layer, the middle layer and the outer reinforcing layer;*

*the wear layer operable to contact a fluid media, the wear layer including the at least one exit nozzle to transport the heavy materials through the outer collecting wall;*

*the middle layer operable to provide structural support to the wear layer, the middle layer including a respective structural shape for each exit nozzle to transport heavy materials through the outer collecting wall; and*

*the outer reinforcement layer operable to provide high pressure and torsional support for the outer collecting wall.*

*4. The centrifuge of claim 3, wherein the wear layer comprises a plurality of inserts selected from the group consisting of hardened wear surfaces, thin-stamped pieces of metal, cast pieces of metal, cast surfaces, and ceramic.*

*5. The centrifuge of claim 3, wherein the wear layer comprises a coating applied to the middle layer, the coating applied by a technique selected from the group consisting of physical vapor deposition, chemical vapor deposition, plating, and chemical transformation.*

*6. The centrifuge of claim 3, wherein the middle layer comprises a casting formed from a relatively lightweight, incompressible metal, ceramic or other incompressible material.*

*7. The centrifuge of claim 3, wherein the middle layer comprises multiple cast sections arranged as a generally horizontal cast or vertical cast or both.*

*8. The centrifuge of claim 3, wherein the respective structural shape includes a multi-walled body void.*

*9. The centrifuge of claim 3, wherein the outer reinforcing layer comprises a filament winding, the filament winding comprises a material selected from the group consisting of steel wire, fiberglass, aramid fibers, carbon and graphite, titanium, steel alloys, other fibers having a tensile strength greater than or equal to titanium, and any combinations of these fibers.*

*10. The centrifuge of claim 3, further comprising the wear layer and the middle layer joined with each other.*

*11. A centrifuge for removing heavy density particles from a fluid medium, comprising:*

*a fluid entry shaft attached to an entry cap, the fluid entry shaft operable to allow a fluid medium to enter the centrifuge;*

*a hybrid outer wall section operable to separate heavy density particles from the fluid medium by centrifugal force and to transport the heavy density particles to a non-rotating outer heavies catchment shell, the hybrid outer wall section including:*

*at least one hardened exit nozzle extending through a wear layer, a compression-load transfer casting and an outer reinforcement layer, the nozzle formed in the hybrid outer wall section operable to transport the heavy density particles to the non-rotating outer heavies catchment shell;*

*the wear layer forming a hardened wear surface over the compression-load transfer casting;*

*the compression-load transfer casting operable to provide a respective geometry to aid in separation of the heavy density particles and provide balance to the hybrid outer wall section; and*

*the outer reinforcement layer operable to increase burst strength and torsional rigidity of the hybrid outer wall section;*

*the non-rotating outer heavies catchment shell operable to contain the heavy density particles separated from the fluid medium which exits the centrifuge through a clarified fluid outlet;*

*a transmission shaft operable to cause rotation of the hybrid outer wall section along a symmetrical axis to produce centrifugal force within the centrifuge; and*

*an end cap coupled to the hybrid outer wall section opposite the entry cap.*

*12. The centrifuge of claim 11, further comprising the wear layer and compression-load transfer casting joined with each other.*

*13. The centrifuge of claim 11, wherein the compression-load transfer casting includes a variety of geometric shapes and an orifice, the orifice operable to provide an opening for the hardened exit nozzle.*

*14. The centrifuge of claim 11, wherein the compression load transfer casting includes a cast slot, the cast slot operable to attach a center member to the centrifuge.*

*15. The centrifuge of claim 11, wherein the center member includes anti-vorticity vanes.*

*16. The method of manufacturing a centrifuge having an outer collecting wall, comprising:*

*providing a centrifuge having a centrifuge core disposed within an outer collecting wall, the outer collecting wall including a wear layer, a middle layer and an outer reinforcement layer;*

*placing the wear layer on the middle layer, the wear layer being in direct communication with a fluid medium and including a wear resistant surface and an hardened nozzle for removing heavy density particles from the fluid medium under centrifugal force;*

*arranging the middle layer in a symmetrical pattern around an axis of rotation within the outer collecting wall, the middle layer operable to maintain structural support for the wear layer and shaped to aid in density separation of the fluid medium under centrifugal force;*

*forming the outer reinforcement layer concentric to the middle layer, the outer wall formed from a filament winding, wherein the filament winding operable to increase burst strength and torsional rigidity of the centrifuge; and*

*aligning the outer collecting wall to rotate around the axis of rotation, the outer collecting wall disposed within a non-rotating sleeve operable to form a containment zone for heavy materials disposed therein.*

*17. The method of claim 16, further comprises disposing a centrifuge core symmetrically around the axis of rotation, the centrifuge core including an anti-vorticity vane.*

*18. The method of claim 16, further comprises designing and fabricating the centrifuge to operate at pressures ranging from 5,000 to 8,000 gravities.*

*19. The method of claim 16, further comprises designing and fabricating the centrifuge to operate within a flow range of 300 to 500 gallons per minute.*

*20. The method of claim 16, further comprises designing and fabricating the centrifuge to remove density particles as small as 0.5 microns in size.*

*21. The method of claim 16, forming the wear layer with thin cast or stamped tile members.*

*22. The method of claim 16, forming the wear layer directly on the middle layer to create a wear resistant surface by a technique selected from the group consisting of physical vapor deposition, chemical vapor deposition, plating, and chemical transformation.*

*23. The method of claim 16, further comprising forming the middle layer selected from the group consisting of a monolithic cast section, a horizontal casting, a vertical casting, a stamped member and any combination thereof.*

*24. A centrifuge having an outer collecting wall, comprising:*

*a centrifuge core disposed within an outer collecting wall;*

*the outer collecting wall disposed within a non-rotating sleeve with a containment zone for heavy materials disposed therebetween;*

*the outer collecting wall including a wear layer, a middle layer and an outer reinforcement layer;*

*at least one hardened material nozzle having a generally apex configuration extending through the wear layer, the middle layer and the outer reinforcing layer;*

*the wear layer operable to contact a fluid media formed from a coating on the inner surfaces by a technique selected from the group consisting of physical vapor deposition, chemical vapor deposition, plating, and chemical transformation, the wear layer including the at least one apex opening to transport the heavy materials through the outer collecting wall;*

*the middle layer operable to provide structural support to the wear layer, the middle layer including a respective structural shape for each apex opening to transport heavy materials through the outer collecting wall;*

*the respective structural shape including a void area forming the interior wall;*

*the void area having a multi-walled shaped including conical and pyramidal shapes with the apex opening operable to direct heavy material into the apex opening to transport the heavy materials through the outer collecting wall; and*

*the outer reinforcement layer formed by a filament winding process operable to provide high pressure and torsional support for the outer collecting wall.*

*25. A centrifuge having an outer collecting wall, comprising:*

*a centrifuge core disposed within an outer collecting wall;*

*the outer collecting wall disposed within a non-rotating sleeve with a containment zone for heavy materials disposed therebetween;*

*the outer collecting wall including a wear layer, a middle layer and an outer reinforcement layer;*

*at least one opening having a generally apex configuration extending through the wear layer, the middle layer and the outer reinforcing layer;*

*the wear layer operable to contact a fluid media formed from tile wear surface inserts, the wear layer including the at least one apex opening to transport the heavy materials through the outer collecting wall;*

*the middle layer operable to provide structural support to the wear layer, the middle layer including a respective structural shape for each apex opening to transport heavy materials through the outer collecting wall;*

*the respective structural shape including a void area forming the interior wall;*

*the void area having a pyramidal shape with the apex opening operable to direct heavy material into the apex opening to transport the heavy materials through the outer collecting wall; and*

*the outer reinforcement layer formed by a filament winding process operable to provide high pressure and torsional support for the outer collecting wall.*

*26. The centrifuge of claim 25, further comprising the middle layer and the outer reinforcement layer joined with each other.*

* * * * *